US008883926B2

(12) United States Patent
Okamoto et al.

(10) Patent No.: US 8,883,926 B2
(45) Date of Patent: *Nov. 11, 2014

(54) ACRYLIC PRESSURE-SENSITIVE ADHESIVE COMPOSITION FOR OPTICAL USE AND ACRYLIC PRESSURE-SENSITIVE ADHESIVE TAPE FOR OPTICAL USE

(75) Inventors: Masayuki Okamoto, Ibaraki (JP); Jun Akiyama, Ibaraki (JP); Kiyoe Shigetomi, Ibaraki (JP); Masahito Niwa, Ibaraki (JP); Masato Yamagata, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,782

(22) Filed: Sep. 13, 2012

(65) Prior Publication Data
US 2013/0005910 A1 Jan. 3, 2013

Related U.S. Application Data

(63) Continuation of application No. PCT/JP2011/001621, filed on Mar. 18, 2011.

(30) Foreign Application Priority Data

Mar. 25, 2010 (JP) .................................. 2010-070383

(51) Int. Cl.
C08F 8/00 (2006.01)
C08L 33/04 (2006.01)
C08L 33/24 (2006.01)
C08L 41/00 (2006.01)
C09J 133/14 (2006.01)
C09J 7/02 (2006.01)
C09J 133/12 (2006.01)
C08L 33/12 (2006.01)
C08L 33/14 (2006.01)

(52) U.S. Cl.
CPC .............. *C09J 7/0217* (2013.01); *C09J 133/14* (2013.01); *C09J 2433/00* (2013.01); *C08L 33/12* (2013.01); *C09J 133/12* (2013.01); *C08L 33/14* (2013.01)
USPC ............ 525/212; 525/218; 525/221; 525/222

(58) Field of Classification Search
USPC ........ 525/212, 218, 221, 222; 156/331.6, 332
See application file for complete search history.

(56) References Cited

U.S. PATENT DOCUMENTS

| 5,654,387 | A | 8/1997 | Bennett et al. | |
|---|---|---|---|---|
| 5,695,837 | A | 12/1997 | Everaerts et al. | |
| 7,097,903 | B2 | 8/2006 | Kishioka et al. | |
| 7,431,985 | B2 | 10/2008 | Iwama | |
| 2004/0191509 | A1 | 9/2004 | Kishioka et al. | |
| 2004/0234582 | A1 | 11/2004 | Kohara | |
| 2004/0260009 | A1 | 12/2004 | Tosaki et al. | |
| 2005/0080195 | A1 | 4/2005 | Iwama | |
| 2005/0202238 | A1 | 9/2005 | Kishioka et al. | |
| 2005/0261433 | A1 | 11/2005 | Takeko et al. | |
| 2006/0292365 | A1 | 12/2006 | Iwama | |
| 2010/0215947 | A1 | 8/2010 | Yamanaka et al. | |
| 2011/0070434 | A1* | 3/2011 | Hirose et al. | 428/355 AC |
| 2011/0236682 | A1 | 9/2011 | Okamoto et al. | |
| 2012/0184680 | A1* | 7/2012 | Akiyama et al. | 525/218 |
| 2013/0004769 | A1* | 1/2013 | Okamoto et al. | 428/355 CN |

FOREIGN PATENT DOCUMENTS

| EP | 0 303 430 | A1 | 2/1989 |
|---|---|---|---|
| EP | 2 169 024 | A1 | 3/2010 |
| JP | 5-43136 | | 1/1979 |
| JP | 1-139665 | A | 6/1989 |
| JP | 5-107410 | A | 4/1993 |
| JP | 6-200225 | A | 7/1994 |
| JP | 6-207151 | A | 7/1994 |
| JP | 8-27450 | A | 1/1996 |
| JP | 9-505103 | A | 5/1997 |
| JP | 9-230138 | A | 9/1997 |
| JP | 10-509198 | A | 9/1998 |
| JP | 10-279907 | A | 10/1998 |
| JP | 11-504054 | T | 4/1999 |
| JP | 2001-089731 | | 4/2001 |
| JP | 2001-89731 | A | 4/2001 |
| JP | 2002-241709 | A | 8/2002 |
| JP | 03-49128 | A | 2/2003 |
| JP | 2003-049130 | A | 2/2003 |
| JP | 2003-129022 | A | 5/2003 |
| JP | 2003-238915 | A | 8/2003 |
| JP | 2003-342542 | A | 12/2003 |
| JP | 2004-91499 | A | 3/2004 |
| JP | 2004-231723 | A | 8/2004 |
| JP | 2004-263084 | A | 9/2004 |
| JP | 2005-15524 | A | 1/2005 |

(Continued)

OTHER PUBLICATIONS

International Search Report for PCT/JP2011/001621 dated Aug. 2, 2011.
Office Action, dated Feb. 13, 2014, issued by the State Intellectual Property Office of the People's Republic of China, in counterpart Application No. 201180015962.9.
International Search Report issued May 26, 2009, in PCT/JP2009/055088, which corresponds to U.S. Appl. No. 12/933,297.
Written Opinion issued May 26, 2009, in PCT/JP2009/055088, which corresponds to U. S. Appl. No.12/933,297.
Extended European Search Report issued on Nov. 16, 2011, in the European Patent Application No. 09721511.1, which corresponds to U.S. Appl. No. 12/933,297.
Chinese Office Action dated Feb. 13, 2012, issued in Chinese Application No. 200980109352.8, which corresponds to U.S. Appl. No. 12/933,297.

(Continued)

*Primary Examiner* — Nathan M Nutter
(74) *Attorney, Agent, or Firm* — Sughrue Mion, PLLC

(57) ABSTRACT

An acrylic pressure-sensitive adhesive composition for optical use includes: an acrylic polymer (A) that contains, as a monomer unit, a vinyl monomer having a nitrogen atom in its backbone and that does not substantially contain a carboxyl group-containing monomer; and a (meth)acrylic polymer (B) having a weight average molecular weight of 1000 or more and less than 30000.

16 Claims, 2 Drawing Sheets

(56) References Cited

FOREIGN PATENT DOCUMENTS

| | | | |
|---|---|---|---|
| JP | 2005-239831 A | 9/2005 | |
| JP | 2005-298723 A | 10/2005 | |
| JP | 2005-298724 A | 10/2005 | |
| JP | 2005-314453 A | 11/2005 | |
| JP | 2006-213603 A | 8/2006 | |
| JP | 2006-290960 A | 10/2006 | |
| JP | 2006265368 A | 10/2006 | |
| JP | 2008-119892 A | 5/2008 | |
| JP | 2008-174658 A | 7/2008 | |
| JP | 2008-222814 A | 9/2008 | |
| JP | 2008-231358 A | 10/2008 | |
| JP | 2008-280375 A | 11/2008 | |
| JP | 2009-108122 A | 5/2009 | |
| JP | 2009120807 A | 6/2009 | |
| WO | 95/13328 A1 | 5/1995 | |
| WO | 96/33246 A1 | 10/1996 | |
| WO | 01-49200 A | 2/2001 | |
| WO | 03/068280 A1 | 8/2003 | |
| WO | 2009116504 A1 | 9/2009 | |
| WO | 2010/06462.3 A | 6/2010 | |
| WO | 2011/118183 A1 | 9/2011 | |

OTHER PUBLICATIONS

Communication from the Japanese Patent Office dated Mar. 27, 2012, in a application No. 2009-038706, which corresponds to U.S. Appl. No. 12/933,297.

Office Action, dated Jan. 24, 2013, issued by the State Intellectual Property Office of P.R. China in Chinese Application No. 200980109352.8, which corresponds to U.S. Appl. No. 12/933,297.

Communication issued Aug. 26, 2013, by the European Patent Office in European application No. 09 721 511.5, which corresponds to U.S. Appl. No. 12/933,297.

Office Action, dated Sep. 5, 2013, issued by the Japanese Patent Office, in Application No. 2009038706, which corresponds to U.S. Appl. No. 12/933,297.

US Non-Final Office Action issued in U.S. Appl. No. 12/933,297, dated Mar. 25, 2013.

US Final Office Action issued in U.S. Appl. No. 12/933,297, dated Aug. 29, 2013.

US Final Office Action issued in U.S. Appl. No. 12/933,297, dated Dec. 9, 2013.

US Non-Final Office Action issued in U.S. Appl. No. 13/352,823, dated Feb. 12, 2013.

US Final Office Action issued in U.S. Appl. No. 13/352,823, dated May 21, 2013.

International Search Report for PCT/JP2011/001619, which corresponds to U.S. Appl. No. 13/614,782, dated Aug. 2, 2011.

Supplementary European Search Report issued in corresponding EP Application No. 11758992.9, dated Sep. 4, 2013, which corresponds to U.S. Appl. No. 13/614,782.

US Non-Final Office Action issued in U.S. Appl. No. 13/614,706, dated Mar. 15, 2013.

US Final Office Action issued in U.S. Appl. No. 13/614,706, dated Sep. 9, 2013.

Notification of Reasons for Refusal dated Sep. 9, 2014, issued by the Japan Patent Office in corresponding Japanese Application No. 2012-506817.

* cited by examiner

ACRYLIC PRESSURE-SENSITIVE ADHESIVE COMPOSITION FOR OPTICAL USE AND ACRYLIC PRESSURE-SENSITIVE ADHESIVE TAPE FOR OPTICAL USE

This is a Continuation of International Application No. PCT/JP2011/001621 filed Mar. 18, 2011, claiming priority based on Japanese Patent Application No. 2010-070383 filed Mar. 25, 2010, the contents of all of which are incorporated herein by reference in their entirety.

BACKGROUND OF THE INVENTION

1. Field of the Invention

The present invention relates to an acrylic pressure-sensitive adhesive composition for optical use and an acrylic pressure-sensitive adhesive tape for optical use.

2. Description of the Related Art

A structure has been conventionally known, in which a protective panel (optical member) made of a plastic plate, such as an acrylic plate, polycarbonate plate, or the like, which is excellent in impact resistance, or tempered glass, is provided on the surface of an image display panel in a display device, such as a plasma display (PDP), liquid crystal display (LCD), organic EL display, field emission display (FED), or the like, in order to protect the image display panel.

In addition, apparatuses in each of which an input device, such as a touch panel, is combined with the aforementioned display device have been widely used in recent years. A display device with which a touch panel is combined has a structure in which, for example, the touch panel is attached to the surface of an image display panel and a protective panel is attached to the surface of the touch panel.

Patent Documents 1 to 8 disclose pressure sensitive adhesive sheets (pressure-sensitive adhesive tapes) and pressure-sensitive adhesives, which are used for the attachment between image display panels and optical members, such as touch panels and protective panels.

PATENT DOCUMENTS

[Patent Document 1] Japanese Patent Application Publication No. 2005-298723
[Patent Document 2] Japanese Patent Application Publication No. 2005-314453
[Patent Document 3] Japanese Patent Application Publication No. 2006-290960
[Patent Document 4] Japanese Patent Application Publication No. 1993-107410
[Patent Document 5] Japanese Patent Application Publication No. 2003-238915
[Patent Document 6] Japanese Patent Application Publication No. 2003-342542
[Patent Document 7] Japanese Patent Application Publication No. 2004-231723
[Patent Document 8] Japanese Patent Application Publication No. 2004-263084

An optical adhesive, which is to be used for the attachment between: an image display panel and a touch panel; and a protective panel and an image display panel or a touch panel, is required to be highly transparent, in order not to cause a decrease in the visibility of the image display panel.

Examples of a pressure-sensitive adhesive having high transparency include an acrylic pressure-sensitive adhesive. An acrylic pressure-sensitive adhesive mostly contains, as a constituent, an acrylic polymer in which an acrylic ester monomer and a carboxyl group-containing monomer as a cohesive component, such as acrylic acid, have been polymerized. In a display device in which a touch panel is installed, however, a transparent electrode, represented by ITO (Indium-Tin Oxide: oxide of indium and tin), is provided on the surface of the touch panel. Accordingly, when an acrylic pressure-sensitive adhesive containing a carboxyl group, such as acrylic acid, is used for the attachment between the touch panel and an image display panel or protective panel, there is the fear that the transparent electrode may corrode over time. It is assumed that, if the transparent electrode has corroded, the electric resistance thereof is changed, thereby causing deterioration in the function of the touch panel. Accordingly, a pressure-sensitive adhesive for optical use is required to have lower corrosiveness to an adherend.

Also, a pressure-sensitive adhesive is generally required to have high adhesiveness to an adherend and the same is naturally true with a pressure-sensitive adhesive for optical use. For example, a pressure-sensitive adhesive for optical use is required to have the property of not causing foaming and subsequent peeling-off (foaming and peeling-off resistance), etc., under various environments (e.g., a high-temperature and high-humidity environment).

SUMMARY OF THE INVENTION

The present invention has been made in view of these situations and a purpose of the invention is to provide an acrylic pressure-sensitive adhesive composition for optical use and an acrylic pressure-sensitive adhesive tape for optical use that have high transparency, high adhesiveness, and low corrosiveness and that are to be used for the attachment between various optical members, etc.

An embodiment of the present invention is an acrylic pressure-sensitive adhesive composition for optical use. The acrylic pressure-sensitive adhesive composition for optical use comprises: an acrylic polymer (A) that contains, as a monomer unit, a vinyl monomer having a nitrogen atom in its backbone and that does not substantially contain a carboxyl group-containing monomer; and a (meth)acrylic polymer (B) having a weight average molecular weight of 1000 or more and less than 30000.

According to an acrylic pressure-sensitive adhesive composition for optical use of this embodiment, an acrylic pressure-sensitive adhesive composition for optical use that has high transparency, high adhesiveness, and low corrosiveness and that is to be used for the attachment between various optical members, etc., can be provided.

In the acrylic pressure-sensitive adhesive composition for optical use according to the aforementioned embodiment, the acrylic polymer (A) may be a copolymer in which the vinyl monomer and a (meth)acrylic acid ester represented by the following general formula (1) are copolymerized together as an essential component:

$$CH_2=C(R^1)COOR^2 \qquad (1)$$

[wherein, $R^1$ is a hydrogen atom or methyl group and $R^2$ is a $C_{1-12}$ alkyl group or alicyclic hydrocarbon group].

In the acrylic pressure-sensitive adhesive composition for optical use according to the aforementioned embodiment, the vinyl monomer may be one or more types of monomers selected from the group consisting of the N-vinyl cyclic amides represented by the following general formula (2) and (meth)acrylic amides:

[Formula 1]

$$CH_2\!=\!CHNCOR^3 \quad (2)$$

[wherein, $R^3$ is a divalent organic group].

In the acrylic pressure-sensitive adhesive composition for optical use according to the aforementioned embodiment, the content of the (meth)acrylic polymer (B) may be within a range of 2 to 70 parts by weight, based on 100 parts by weight of the acrylic polymer (A).

Another embodiment according to the present invention is an acrylic pressure-sensitive adhesive tape for optical use. The acrylic pressure-sensitive adhesive tape for optical use has a pressure-sensitive adhesive layer containing the acrylic pressure-sensitive adhesive composition for optical use according to any one of the aforementioned embodiments.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

Figure 1:
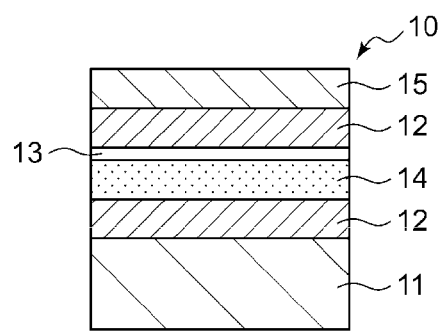
FIG. 1 is a schematic sectional view illustrating part of a display device in which an acrylic pressure-sensitive adhesive tape for optical use according to an embodiment has been used.

The invention will now be described by reference to the preferred embodiments. This does not intend to limit the scope of the present invention, but to exemplify the invention.

Hereinafter, embodiments of the present invention will be described with reference to the accompanying drawings.

An acrylic pressure-sensitive adhesive composition for optical use according to the present embodiment comprises: an acrylic polymer (A) as an pressure-sensitive adhesive composition; and a (meth)acrylic polymer (B), as a tackifying resin, that has a weight average molecular weight of 1000 or more and less than 30000 (hereinafter, appropriately referred to as a (meth)acrylic polymer (B)). Hereinafter, the acrylic polymer (A) and the (meth)acrylic polymer (B) will be described in detail.

[Acrylic Polymer (A)]

The acrylic polymer (A) is a polymer that contains, as a monomer unit, a vinyl monomer having a nitrogen atom in its backbone and that does not substantially contain a carboxyl group-containing monomer. The acrylic pressure-sensitive adhesive composition for optical use according to the present embodiment has moderate polarity by containing, in the acrylic polymer (A) and as a monomer unit, a vinyl monomer having a nitrogen atom in its backbone. In addition, it is prevented that the polarity of the acrylic polymer (A) may become too large by not substantially containing a carboxyl group-containing monomer in the acrylic polymer (A). Thereby, the affinity between the acrylic polymer (A) and the (meth)acrylic polymer (B) having polarity between low polarity and middle polarity can be enhanced. Thereby, the adhesiveness of an acrylic pressure-sensitive adhesive tape for optical use to an adherend can be improved and the transparency thereof can be enhanced. Further, by not substantially containing a carboxyl group-containing monomer in the acrylic polymer (A), it can be prevented that an adhered may corrode.

Herein, the aforementioned "a carboxyl group-containing monomer" refers to a vinyl monomer (ethylenically unsaturated monomer) having at least one carboxyl group (that can be in an anhydride form) in its single molecule. Specific examples of such a carboxyl group-containing monomer include: ethylenically unsaturated monocarbonic acids, such as (meth)acrylic acid and crotonic acid; ethylenically unsaturated dicarbonic acids, such as maleic acid, itaconic acid, and citraconic acid; and ethylenically unsaturated dicarbonic acid anhydrides, such as maleic acid anhydride and itaconic acid anhydride, etc. In addition, the aforementioned "not substantially containing" means, for example, that the acrylic polymer (A) does not contain a carboxyl group-containing monomer at all or that the content thereof is 0.1% by weight or less, based on the total weight of the whole monomer components. Alternatively, the aforementioned "not substantially containing" means, for example, that the content of the carboxyl group contained in the acrylic polymer (A) is 0.0014 mol/gram equivalent or less.

It is preferable that the acrylic polymer (A) does not substantially contain a carboxyl group-containing monomer and also does not substantially contain a monomer containing an acid group other than a carboxyl group (sulfonic acid group, phosphoric acid group, or the like). That is, it is preferable that a carboxyl group-containing monomer and a monomer containing another acid group are not contained at all or that the total amount of the two is 0.1% by weight or less, based on the total weight of the whole monomer components. Alternatively, it is preferable that the total amount of the carboxyl group and another acid group, contained in the acrylic polymer (A), is 0.0014 mol/gram equivalent or less.

The acrylic polymer (A) is a copolymer in which, for example, a vinyl monomer having a nitrogen atom in its backbone and the (meth)acrylic acid ester represented by the following general formula (1) are copolymerized together as an essential component:

$$CH_2\!=\!C(R^1)COOR^2 \quad (1)$$

[wherein, $R^1$ is a hydrogen atom or methyl group and $R^2$ is a $C_{1\text{-}12}$ alkyl group or alicyclic hydrocarbon group].

The acrylic polymer (A) can be obtained by polymerizing (for example, solution polymerization, emulsion polymerization, UV polymerization) a vinyl monomer and a (meth)alkyl acid ester along with a polymerization initiator. Herein, the aforementioned "copolymerized together as an essential component" means that the total amount of the vinyl monomer and the (meth)acrylic acid ester is approximately 50% by weight or more, based on the total weight of the monomer components that form the acrylic polymer (A). The total amount of the vinyl monomer and the (meth)acrylic acid ester is within a range of approximately 50% by weight or more to approximately 99.9% by weight or less, preferably within a range of approximately 60% by weight or more to approximately 95% by weight or less, and more preferably within a range of approximately 70% by weight or more to approximately 85% by weight or less, based on the total weight of the monomer components.

It is preferable that the vinyl monomer having a nitrogen atom in its backbone is one or more types of monomers selected from the group consisting of the N-vinyl cyclic amides represented by the following general formula (2) and (meth)acrylic amides:

[Formula 2]

(2)

[wherein, $R^3$ is a divalent organic group].

Specific examples of the N-vinyl cyclic amides include N-vinyl-2-pyrrolidone, N-vinyl-2-piperidone, N-vinyl-3-morpholine, N-vinyl-2-caprolactam, N-vinyl-1,3-oxazine-2-one, and N-vinyl-3,5-morpholine dione, etc.

Specific examples of the (meth)acrylic amides include: (meth)acrylamide; N-alkyl(meth)acrylamides, such as N-ethyl(meth)acrylamide, N-n-butyl(meth)acrylamide, N-isopropyl(meth)acrylamide, N-methylol(meth)acrylamide, N-methylolpropane(meth)acrylamide, N-methoxymethyl(meth)acrylamide, and N-butoxymethyl(meth)acrylamide; N,N-dialkyl(meth)acrylamides, such as N,N-dimethyl(meth)acrylamide, N,N-diethyl(meth)acrylamide, N,N-dipropyl(meth)acrylamide, N,N-diisopropyl(meth)acrylamide, N,N-di(n-butyl)(meth)acrylamide, and N,N-di(t-butyl)(meth)acrylamide; N-methylol(meth)acrylamide; and N-ethylol(meth)acrylamide, etc. These vinyl monomers can be used alone or in combination of two or more thereof.

Examples of a vinyl monomer having a nitrogen atom in its backbone other than the aforementioned vinyl monomers include: succinimide monomers, such as N-(meth)acryloyloxy methylenesuccinimide, N-(meth)acryloyl-6-oxyhexamethylene succinimide, and N-(meth)acryloyl-8-oxyhexamethylene succinimide; maleimide monomers, such as N-cyclohexyl maleimide, N-isopropylmaleimide, N-lauryl maleimide, and N-phenylmaleimide; itaconimide monomers, such as N-methyl itaconimide, N-ethyl itaconimide, N-butyl itaconimide, N-octyl itaconimide, N-2-ethylhexyl itaconimide, N-cyclohexyl itaconimide, and N-lauryl itaconimide; nitrogen-containing heterocyclic monomers, such as N-methylvinyl pyrrolidone, N-vinylpyrazine, N-vinylimidazole, N-vinyloxazole, N-(meth)acryloyl piperidine, N-(meth)acryloyl pyrrolidine, N-vinylmorpholine, N-vinylpyrazole, N-vinylisoxazol, N-vinylthiazole, N-vinylisothiazole, N-vinyl pyridazine, N-(meth)acryloyl-2-pyrrolidone, N-vinylpyridine, N-vinylpyrimidine, N-vinylpiperazine, and N-vinylpyrrole; lactam monomers, such as N-vinylcaprolactam; (meth)acrylic acid amino alkyl monomers, such as (meth)acrylic acid aminoethyl, (meth)acrylic acid N,N-dimethylaminoethyl, (meth)acrylic acid N,N-dimethylaminoethyl, and (meth)acrylic acid t-butylaminoethyl; isocyanate group-containing monomers, such as 2-isocyanate ethyl(meth)acrylate; acryloyl morpholine; and N-vinyl carboxylic acid amides, etc. These vinyl monomers can be used alone or in combination of two or more thereof.

The N-vinyl cyclic amides represented by the aforementioned general formula (2) and (meth)acrylamides can be preferably used as the vinyl monomer. $R^3$ in the aforementioned general formula (2) is preferably a saturated or unsaturated hydrocarbon group, and more preferably a saturated hydrocarbon group (e.g., a $C_{3-5}$ alkylene group). Examples of the particularly preferred N-vinyl cyclic amides include N-vinyl-2-pyrrolidone and N-vinyl-2-caprolactam. Examples of the particularly preferred (meth)acrylamides include N,N-dimethyl(meth)acrylamide and N,N-diethyl(meth)acrylamide.

Specific examples of the (meth)acrylic acid esters represented by the aforementioned general formula (1) include: (meth)acrylic acid alkyl esters, such as (meth)acrylic acid methyl, (meth)acrylic acid ethyl, (meth)acrylic acid propyl, (meth)acrylic acid isopropyl, (meth)acrylic acid butyl, (meth)acrylic acid isobutyl, (meth)acrylic acid s-butyl, (meth)acrylic acid t-butyl, (meth)acrylic acid pentyl, (meth)acrylic acid isopentyl, (meth)acrylic acid hexyl, (meth)acrylic acid heptyl, (meth)acrylic acid octyl, (meth)acrylic acid-2-ethylhexyl (2-ethylhexyl(meth)acrylate), (meth)acrylic acid isooctyl, (meth)acrylic acid nonyl, (meth)acrylic acid isononyl, (meth)acrylic acid decyl, (meth)acrylic acid isodecyl, (meth)acrylic acid undecyl, and (meth)acrylic acid dodecyl; (meth)acrylic acid esters having an alicyclic hydrocarbon group, such as cyclopentyl(meth)acrylate, cyclohexyl(meth)acrylate, and isobornyl(meth)acrylate; (meth)acrylic acid esters having an aromatic hydrocarbon group, such as phenyl (meth)acrylate; and (meth)acrylic acid esters obtained from alcohols derived from terpene compounds, etc. These (meth)acrylic acid esters can be used alone or in combination. Herein, the (meth)acrylic acid esters mean acrylic acid esters and/or methacrylic acid esters, and all of the "(meth) . . . " expressions have the same meaning.

For the purpose of modifying cohesive force, heat resistance, and cross-linking property, etc., the acrylic polymer (A) may contain, if necessary, another monomer component (copolymerizable monomer) that is copolymerizable with the vinyl monomer and the (meth)acrylic acid ester. That is, the acrylic polymer (A) may contain a copolymerizable monomer along with the vinyl monomer and (meth)acrylic acid ester as major components.

Specific examples of the copolymerizable monomer include: vinyl esters, such as vinyl acetate and vinyl propionate; cyanoacrylate monomers, such as acrylonitrile and methacrylonitrile; (meth)acrylic acid alkoxy alkyl monomers, such as (meth)acrylic acid methoxyethyl and (meth)acrylic acid ethoxyethyl; hydroxyl group-containing monomers, such as (meth)acrylic acid hydroxyalkyls including (meth)acrylic acid hydroxyethyl, (meth)acrylic acid hydroxypropyl, (meth)acrylic acid hydroxybutyl, (meth)acrylic acid hydroxyhexyl, (meth)acrylic acid hydroxy octyl, (meth)acrylic acid hydroxydecyl, (meth)acrylic acid hydroxylauryl, and (4-hydroxymethyl cyclohexyl)methyl methacrylate, etc.; styrene monomers, such as styrene and α-methylstyrene; epoxy group-containing acrylic monomers, such as (meth)acrylic acid glycidyl; glycol acrylic ester monomers, such as (meth)acrylic acid polyethylene glycol, (meth)acrylic acid polypropylene glycol, (meth)acrylic acid methoxyethylene glycol, and (meth)acrylic acid methoxypolypropylene glycol; acrylic acid ester monomers having a heterocycle, halogen atom, silicon atom, or the like, such as (meth)acrylic acid tetrahydrofurfuryl, fluorine atom-containing (meth)acrylate, and silicone(meth)acrylate; olefin monomers, such as isoprene, butadiene, and isobutylene; vinyl ether monomers, such as methyl vinyl ether and ethyl vinyl ether; aromatic vinyl compounds, such as vinyl toluene and styrene; olefins or dienes, such as ethylene, butadiene, isoprene, and isobutylene; vinyl ethers, such as vinyl alkyl ether; and vinyl chloride; etc. These copolymerizable monomers can be used alone or in combination of two or more thereof.

The use amount of the copolymerizable monomer is not particularly limited, but the copolymerizable monomer can be usually contained in an amount within a range of approximately 0.1 to approximately 40% by weight, preferably within a range of approximately 0.5 to approximately 30% by weight, and more preferably within a range of approximately 1 to approximately 20% by weight, based on the total weight of the monomer components for preparing the acrylic polymer (A).

By containing the copolymerizable monomer in an amount of approximately 0.1% by weight or more, a decrease in the cohesive force of the acrylic pressure-sensitive adhesive tape or sheet having a pressure-sensitive adhesive layer formed of the acrylic pressure-sensitive adhesive composition can be prevented, and high shear force can be obtained. Further, by containing the copolymerizable monomer in an amount of approximately 40% by weight or less, it can be prevented that the cohesive force may become too large, and the tackiness at normal temperature (25° C.) can be improved.

A polyfunctional monomer may be contained, if necessary, in the acrylic polymer (A) in order to adjust the cohesive force of the acrylic pressure-sensitive adhesive composition to be formed.

Examples of the polyfunctional monomer include, for example: (poly)ethylene glycol di(meth)acrylate, (poly)propylene glycol di(meth)acrylate, neopentyl glycol di(meth)acrylate, pentaerythritol di(meth)acrylate, pentaerythritol tri(meth)acrylate, dipentaerythritol hexa(meth)acrylate, 1,2-ethylene glycol di(meth)acrylate, 1,6-hexanediol di(meth)acrylate, 1,12-dodecane diol di(meth)acrylate, trimethylolpropane tri(meth)acrylate, tetramethylol methane tri(meth)acrylate, allyl(meth)acrylate, vinyl(meth)acrylate, divinylbenzene, epoxy acrylate, polyester acrylate, urethane acrylate, butyl di(meth)acrylate, and hexyl di(meth)acrylate, etc. Among them, trimethylolpropane tri(meth)acrylate, hexanediol di(meth)acrylate, and dipentaerythritol hexa(meth)acrylate can be preferably used. The polyfunctional (meth)acrylates can be used alone or in combination of two or more thereof.

The use amount of the polyfunctional monomer is changed depending on the molecular weight or the number of functional groups thereof, but the polyfunctional monomer is added in an amount within a range of approximately 0.01 to approximately 3.0% by weight, preferably within a range of approximately 0.02 to approximately 2.0% by weight, and more preferably within a range of approximately 0.03 to approximately 1.0% by weight, based on the total weight of the monomer components for preparing the acrylic polymer (A).

If the use amount of the polyfunctional monomer is more than approximately 3.0% by weight based on the total weight of the monomer components for preparing the acrylic polymer (A), for example, the cohesive force of the acrylic pressure-sensitive adhesive composition may become too high and accordingly there are sometimes the cases where the adhesive force is decreased. On the other hand, if the use amount thereof is less than approximately 0.01% by weight, for example, there are sometimes the cases where the cohesive force of the acrylic pressure-sensitive adhesive composition is decreased.

<Polymerization Initiator>

In preparing the acrylic polymer (A), the acrylic polymer (A) can be easily formed by a curing reaction using heat or ultraviolet rays with the use of a polymerization initiator, such as thermal polymerization initiator, photo-polymerization initiator (photo-initiator), or the like. In particular, a photo-polymerization initiator can be preferably used in terms of the advantage that a polymerization time can be shortened. The polymerization initiators can be used alone or in combination of two or more thereof.

Examples of the thermal polymerization initiator include, for example: azo polymerization initiators (for example, 2,2'-azobisisobutyronitrile, 2,2'-azobis-2-methylbutyronitrile, 2,2'-azobis(2-methylpropionic acid)dimethyl, 4,4'-azobis-4-cyanovalerianic acid, azobis isovaleronitrile, 2,2'-azobis(2-amidinopropane)dihydrochloride, 2,2'-azobis[2-(5-methyl-2-imidazoline-2-yl)propane]dihydrochloride, 2,2'-azobis(2-methylpropionamidine)disulfate, and 2,2'-azobis(N,N'-dimethyleneisobutylamidine)dihydrochloride, etc.); peroxide polymerization initiators (for example, dibenzoyl peroxide, t-butyl permaleate, and lauroyl peroxide, etc.); and redox polymerization initiators, etc.

The use amount of the thermal polymerization initiator is not particularly limited, and only has to be within a conventional range in which it can be used as a thermal polymerization initiator.

The photo-polymerization initiator is not particularly limited, but, for example, a benzoin ether photo-polymerization initiator, acetophenone photo-polymerization initiator, α-ketol photo-polymerization initiator, aromatic sulfonyl chloride photo-polymerization initiator, photoactive oxime photo-polymerization initiator, benzoin photo-polymerization initiator, benzyl photo-polymerization initiator, benzophenone photo-polymerization initiator, ketal photo-polymerization initiator, thioxanthone photo-polymerization initiator, acylphosphine oxide photo-polymerization initiator, or the like, can be used.

Specific examples of the benzoin ether photo-polymerization initiator include, for example: benzoin methyl ether, benzoin ethyl ether, benzoin propyl ether, benzoin isopropyl ether, benzoin isobutyl ether, 2,2-dimethoxy-1,2-diphenylethane-1-one [product name: IRGACURE 651, made by Ciba Speciality Chemicals Inc.], and anisole methyl ether, etc. Specific examples of the acetophenone photo-polymerization initiator include, for example: 1-hydroxycyclohexyl phenyl ketone [product name: IRGACURE 184, made by Ciba Speciality Chemicals Inc.], 4-phenoxy dichloroacetophenone, 4-t-butyl-dichloroacetophenone, 1-[4-(2-hydroxyethoxy)-phenyl]-2-hydroxy-2-methyl-1-propane-1-one [product name: IRGACURE 2959, made by Ciba Speciality Chemicals Inc.], 2-hydroxy-2-methyl-1-phenyl-propane-1-one [product name: DAROCUR 1173, made by Ciba Speciality Chemicals Inc.], and methoxy acetophenone, etc. Specific examples of the α-ketol photo-polymerization initiator include, for example: 2-methyl-2-hydroxy propiophenone and 1-[4-(2-hydroxyethyl)-phenyl]-2-hydroxy-2-methylpropane-1-one, etc. Specific examples of the aromatic sulfonyl chloride photo-polymerization initiator include, for example, 2-naphthalene sulfonyl chloride, etc. Specific examples of the photoactive oxime photo-polymerization initiator include, for example, 1-phenyl-1,1-propanedione-2-(o-ethoxycarbonyl)-oxime, etc.

Specific examples of the benzoin photo-polymerization initiator include, for example, benzoin, etc. Specific examples of the benzyl photo-polymerization initiator include, for example, benzyl, etc. Specific examples of the benzophenone photo-polymerization initiators include, for example, benzophenone, benzoylbenzoic acid, 3,3'-dimethyl-4-methoxybenzophenone, polyvinyl benzophenone, and α-hydroxy cyclohexyl phenyl ketone, etc. Specific examples of the ketal photo-polymerization initiator include, for example, benzyl dimethyl ketal, etc. Specific examples of the thioxanthone photo-polymerization initiator include, for example, thioxanthone, 2-chlorothioxanthone, 2-methyl thioxanthone, 2,4-dimethyl thioxanthone, isopropyl thioxanthone, 2,4-dichloro thioxanthone, 2,4-diethyl thioxanthone, isopropyl thioxanthone, 2,4-diisopropyl thioxanthone, and dodecyl thioxanthone, etc.

Examples of the acylphosphine photo-polymerization initiator include, for example: bis(2,6-dimethoxybenzoyl)phenylphosphine oxide, bis(2,6-dimethoxybenzoyl)(2,4,4-trimethylpentyl)phosphine oxide, bis(2,6-dimethoxybenzoyl)-n-butyl phosphine oxide, bis(2,6-dimethoxybenzoyl)-(2-methylpropane-1-yl)phosphine oxide, bis(2,6-dimethoxybenzoyl)-(1-methylpropane-1-yl)phosphine oxide, bis(2,6-dimethoxybenzoyl)-t-butylphosphine oxide, bis(2,6-dimethoxybenzoyl)cyclohexylphosphine oxide, bis(2,6-dimethoxybenzoyl)octylphosphine oxide, bis(2-methoxybenzoyl)(2-methylpropane-1-yl)phosphine oxide, bis(2-methoxybenzoyl)(1-methylpropane-1-yl)phosphine oxide, bis(2,6-diethoxybenzoyl)(2-methylpropane-1-yl)phosphine oxide, bis(2,6-diethoxybenzoyl)(1-methylpropane-1-yl)phosphine oxide, bis(2,6-dibutoxybenzoyl)(2-methylpropane-1-yl)phosphine oxide, bis(2,4-dimethoxybenzoyl)(2-methylpropane-1-yl)phosphine oxide, bis(2,4,6-trimethylbenzoyl)(2,4-dipentoxyphenyl)phosphine oxide, bis(2,6-dimethoxybenzoyl)benzyl phosphine oxide, bis(2,6-dimethoxybenzoyl)-2-phenylpropyl phosphine oxide, bis(2,6-dimethoxybenzoyl)-2-phenylethyl phosphine oxide, bis(2,6-dimethoxybenzoyl)benzyl phosphine oxide, bis(2,6-dimethoxybenzoyl)-2-phenylpropyl phosphine oxide, bis(2,6-dimethoxybenzoyl)-2-phenylethyl phosphine oxide, 2,6-dimethoxybenzoyl benzylbutylphosphine oxide, 2,6-dimethoxybenzoyl benzyloctylphosphine oxide, bis(2,4,6-trimethylbenzoyl)-2,5-diisopropylphenylphosphine oxide, bis(2,4,6-trimethylbenzoyl)-2-methylphenylphosphine oxide, bis(2,4,6-trimethylbenzoyl)-4-methylphenylphosphine oxide, bis(2,4,6-trimethylbenzoyl)-2,5-diethylphenylphosphine oxide, bis(2,4,6-trimethylbenzoyl)-2,3,5,6-tetramethylphenylphosphine oxide, bis(2,4,6-trimethyl benzoyl)-2,4-di-n-butoxy phenylphosphine oxide, 2,4,6-trimethylbenzoyl diphenylphosphine oxide, bis(2,6-dimethoxybenzoyl)-2,4,4-trimethylpentylphosphine oxide, bis(2,4,6-trimethylbenzoyl)isobutylphosphine oxide, 2,6-dimethoxybenzoyl-2,4,6-trimethylbenzoyl-n-butylphosphine oxide, bis(2,4,6-trimethylbenzoyl)phenylphosphine oxide, bis(2,4,6-trimethylbenzoyl)-2,4-dibutoxyphenylphosphine oxide, 1,10-bis[bis(2,4,6-trimethylbenzoyl)phosphine oxide]decane, and tri(2-methylbenzoyl)phosphine oxide, etc.

The use amount of the photo-polymerization initiator is not particularly limited, but the photo-polymerization initiator is combined in an amount within a range of, for example, approximately 0.01 to approximately 5 parts by weight, and preferably within a range of approximately 0.05 to approximately 3 parts by weight, based on 100 parts by weight of the monomer components for preparing the acrylic polymer (A).

If the use amount of the photo-polymerization initiator is less than approximately 0.01 parts by weight, there are sometimes the cases where a polymerization reaction becomes insufficient. If the use amount thereof is more than approximately 5 parts by weight, there are sometimes the cases where an ultraviolet ray does not reach the inside of the pressure-sensitive adhesive layer, because the photo-polymerization initiator absorbs an ultraviolet ray. In this case, a decrease in the rate of polymerization is caused, or the molecular weight of the generated polymer becomes small. Thereby, the cohesive force of the formed pressure-sensitive adhesive layer becomes small, and hence there are sometimes the cases where, when the pressure-sensitive adhesive layer is peeled off from a film, part of the pressure-sensitive adhesive layer remains on the film and accordingly the film cannot be reused.

The photo-polymerization initiators may be used alone or in combination of two or more thereof.

Besides the aforementioned polyfunctional monomers, a cross-linking agent can also be used for adjusting the cohesive force. Commonly-used cross-linking agents can be used as the cross-linking agent. Examples of the cross-linking agents include, for example: epoxy cross-linking agent, isocyanate cross-linking agent, silicone cross-linking agent, oxazoline cross-linking agent, aziridine cross-linking agent, silane cross-linking gent, alkyl-etherified melamine cross-linking agent, and metal chelate cross-linking agent, etc. In particular, the isocyanate cross-linking agent and epoxy cross-linking agent can be preferably used.

Specific examples of the isocyanate cross-linking agent include: tolylene diisocyanate, hexamethylene diisocyanate, isophorone diisocyanate, xylylene diisocyanate, hydrogenated xylylene diisocyanate, diphenylmethane diisocyanate, hydrogenated diphenylmethane diisocyanate, tetramethyl xylylene diisocyanate, naphthalene diisocyanate, triphenylmethane triisocyanate, polymethylene polyphenyl isocyanate, and these adducts with polyols, such as trimethylolpropane.

Examples of the epoxy cross-linking agent include: bisphenol A, epichlorohydrin type epoxy resin, ethyleneglycidylether, polyethylene glycol diglycidyl ether, glycerin diglycidyl ether, glycerin triglycidyl ether, 1,6-hexanediol glycidyl ether, trimethylolpropane triglycidyl ether, diglycidyl aniline, diamine glycidyl amine, N,N,N',N'-tetraglycidyl-m-xylylenediamine, and 1,3-bis(N,N'-diamine glycidyl aminomethyl)cyclohexane, etc.

In addition, the pressure-sensitive adhesive composition according to the present invention may appropriately contain a conventionally and publicly-known silane coupling agent from the viewpoint of the adhesiveness to an optical member, such as glass.

Examples of the aforementioned silane coupling agent include, for example: vinyl group-containing silane coupling agents, such as vinyltrichlorosilane, vinyltris(β-methoxyethoxy)silane, vinyltriethoxysilane, and vinyltrimethoxysilane; styryl group-containing silane coupling agents, such as p-styryltrimethoxysilane; (meth)acryloyl group-containing silane coupling agents, such as γ-methacryloxypropyltrimethoxysilane, γ-methacryloxypropyltriethoxysilane, and γ-acryloxypropyltrimethoxysilane; epoxy group-containing silane coupling agents, such as β-(3,4-epoxycyclohexyl)ethyltrimethoxysilane, γ-glycidoxypropyltrimethoxysilane, and γ-glycidoxypropyltriethoxysilane; amino group-containing silane coupling agents, such as N-β(aminoethyl)γ-aminopropyltrimethoxysilane, N-β(aminoethyl)γ-aminopropyldimethoxysilane, γ-aminopropyltriethoxysilane, and N-phenyl-γ-aminopropyltrimethoxysilane; and silane coupling agents, such as γ-chloropropyltrimethoxysilane, γ-mercaptopropylmethyldimethoxysilane, bis(triethoxysilylpropyl)tetrasulfide, and γ-isocyanatepropyltrimethoxysilane. A silane coupling agents having an epoxy group can be used preferably, and γ-glycidoxypropyltrimethoxysilane can be used more preferably.

The use amount of the silane coupling agent is usually set to be within a range of 0.001 to 5 parts by weight, and preferably set to be within a range of 0.01 to 2 parts by weight, based on 100 parts by weight of the acrylic polymer. If the use amount of the silane coupling agent is too small, the adhesiveness to an optical member, such as glass, cannot be sufficiently improved, while the use amount thereof is too large, there is the fear that it may become difficult to maintain the adhesive property, etc., at a good condition.

In the present embodiment, the acrylic polymer (A) can also be prepared as a partial polymer (acrylic polymer syrup) that can be obtained by radiating ultraviolet (UV) rays onto a mixture in which the aforementioned monomer components and the polymerization initiator have been combined, so that the monomer components are partially polymerized. An acrylic pressure-sensitive adhesive composition is prepared by combining the later-described (meth)acrylic polymer (B) into the acrylic polymer syrup, and then polymerization can also be completed by coating the pressure-sensitive adhesive composition on a predetermined object to be coated and by radiating UV rays. The weight average molecular weight (Mw) of the acrylic polymer (A) is, for example, 30000 or more and 5000000 or less.

[(Meth)Acrylic Polymer (B)]

The (meth)acrylic polymer (B) is a polymer having a weight average molecular weight smaller than that of the acrylic polymer (A), and functions as a tackifying resin and has the advantage that inhibition of polymerization is hardly caused when UV polymerization is performed. The (meth)acrylic polymer (B) includes, for example, a (meth)acrylic acid ester as a monomer unit.

Examples of such a (meth)acrylic acid ester include: (meth)acrylic acid alkyl esters, such as, (meth)acrylic acid methyl, (meth)acrylic acid ethyl, (meth)acrylic acid propyl, (meth)acrylic acid isopropyl, (meth)acrylic acid butyl, (meth)acrylic acid isobutyl, (meth)acrylic acid s-butyl, (meth)acrylic acid t-butyl, (meth)acrylic acid pentyl, (meth)acrylic acid isopentyl, (meth)acrylic acid hexyl, (meth)acrylic acid-2-ethylhexyl, (meth)acrylic acid heptyl, (meth)acrylic acid octyl, (meth)acrylic acid isooctyl, (meth)acrylic acid nonyl, (meth)acrylic acid isononyl, (meth)acrylic acid decyl, (meth)acrylic acid isodecyl, (meth)acrylic acid undecyl, and (meth)acrylic acid dodecyl; esters of (meth)acrylic acids with alicyclic alcohols, such as cyclohexyl(meth)acrylate and isobornyl (meth)acrylate; (meth)acrylic acid aryl esters, such as (meth)acrylic acid phenyl and (meth)acrylic acid benzyl; and (meth)acrylic acid esters obtained from alcohols derived from terpene compounds. These (meth)acrylic acid esters can be used alone or in combination of two or more thereof.

The (meth)acrylic polymer (B) can also be obtained by copolymerizing, other than the aforementioned (meth)acrylic acid ester component units, another monomer component (copolymerizable monomer) that is copolymerizable with the (meth)acrylic acid ester.

Examples of the another monomer that is copolymerizable with the (meth)acrylic acid ester include: (meth)acrylic acid alkoxyalkyl monomers, such as (meth)acrylic acid methoxyethyl, (meth)acrylic acid ethoxyethyl, (meth)acrylic acid propoxyethyl, (meth)acrylic acid butoxyethyl, and (meth)acrylic acid ethoxypropyl; salts, such as (meth)acrylic acid alkali metal salt; di(meth)acrylic acid ester monomers of (poly)alkylene glycols, such as di(meth)acrylic acid ester of ethylene glycol, di(meth)acrylic acid ester of diethylene glycol, di(meth)acrylic acid ester of triethylene glycol, di(meth)acrylic acid ester of polyethylene glycol, di(meth)acrylic acid ester of propylene glycol, di(meth)acrylic acid ester of dipropylene glycol, and di(meth)acrylic acid ester of tripropylene glycol; poly(meth)acrylic acid ester monomers, such as trimethylolpropane tri(meth)acrylic acid ester; vinyl esters, such as vinyl acetate and vinyl propionate; halogenated vinyl compounds, such as vinylidene chloride and (meth)acrylic acid-2-chloroethyl; oxazoline group-containing polymerizable compounds, such as 2-vinyl-2-oxazoline, 2-vinyl-5-methyl-2-oxazoline, and 2-isopropenyl-2-oxazoline; aziridine group-containing polymerizable compounds, such as (meth)acryloylaziridine and (meth)acrylic acid-2-aziridinylethyl; epoxy group-containing vinyl monomers, such as allyl glycidyl ether, (meth)acrylic acid glycidyl ether, and (meth)acrylic acid-2-ethyl glycidyl ether; hydroxyl group-containing vinyl monomers, such as (meth)acrylic acid-2-hydroxyethyl, (meth)acrylic acid-2-hydroxypropyl, monoesters of (meth)acrylic acids with polypropylene glycol or polyethylene glycol, and adducts of lactones with (meth)acrylic acid-2-hydroxyethyl; fluorine-containing vinyl monomers, such as fluorine-substituted (meth)acrylic acid alkyl ester; acid anhydride group-containing monomers, such as maleic acid anhydride and itaconic acid anhydride; aromatic vinyl compound monomers, such as styrene, α-methylstyrene, and vinyl toluene; reactive halogen-containing vinyl monomers, such as 2-chloroethyl vinyl ether and monochloro vinyl acetate; amide group-containing vinyl monomers, such as (meth)acrylamide, N-isopropyl(meth)acrylamide, N-butyl(meth)acrylamide, N,N-diethyl(meth)acrylamide, N,N-dimethyl(meth)acrylamide, N-methylol(meth)acrylamide, N-ethylol(meth)acrylamide, N-methylolpropane(meth)acrylamide, N-methoxyethyl(meth)acrylamide, N-butoxymethyl(meth)acrylamide, and N-acryloyl morpholine; succinimide monomers, such as N-(meth)acryloyloxy methylene succinimide, N-(meth)acryloyl-6-oxy hexamethylene succinimide, and N-(meth)acryloyl-8-oxy hexamethylene succinimide; maleimide monomers, such as N-cyclohexyl maleimide, N-isopropylmaleimide, N-lauryl maleimide, and N-phenyl maleimide; itaconimide monomers, such as N-methylitaconimide, N-ethylitaconimide, N-butylitaconimide, N-octylitaconimide, N-2-ethylhexylitaconimide, N-cyclohexylitaconimide, and N-laurylitaconimide; nitrogen-containing heterocyclic monomers, such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-(meth)acryloyl-2-pyrrolidone, N-(meth)acryloylpiperidine, N-(meth)acryloylpyrrolidine, N-vinyl morpholine, N-vinyl pyrazole, N-vinyl isoxazole, N-vinyl thiazole, N-vinyl isothiazole, and N-vinyl pyridazine; N-vinyl carboxylic acid amides; lactam monomers, such as N-vinyl caprolactam; cyanoacrylate monomers, such as (meth)acrylonitrile; (meth)acrylic acid aminoalkyl monomers, such as (meth)acrylic acid aminoethyl, (meth)acrylic acid N,N-dimethylaminoethyl, (meth)acrylic acid N,N-dimethylaminoethyl, and (meth)acrylic acid t-butylaminoethyl; imide group-containing monomers, such as cyclohexyl maleimide and isopropyl maleimide; isocyanate group-containing monomers, such as 2-isocyanate ethyl(meth)acrylate; organic silicon-containing vinyl monomers, such as vinyltrimethoxysilane, γ-methacryloxypropyl trimethoxy silane, allyltrimethoxysilane, trimethoxysilylpropylallylamine, and 2-methoxy ethoxy trimethoxy silane; hydroxyl group-containing monomers, such as (meth)acrylic acid hydroxyalkyls including (meth)acrylic acid hydroxyethyl, (meth)acrylic acid hydroxypropyl, (meth)acrylic acid hydroxybutyl, (meth)acrylic acid hydroxyhexyl, (meth)acrylic acid hydroxyoctyl, (meth)acrylic acid hydroxydecyl, (meth)acrylic acid hydroxylauryl, and (4-hydroxymethyl cyclohexyl)methyl methacrylate; acrylic acid ester monomers having a heterocycle, halogen atom, silicon atom, or the like, such as (meth)acrylic acid tetrahydrofurfuryl, fluorine atom-containing (meth)acrylate, and silicone (meth)acrylate; olefin monomers, such as isoprene, butadiene, and isobutylene; vinyl ether monomers, such as methyl vinyl ether and ethyl vinyl ether; olefins or dienes, such as ethylene, butadiene, isoprene, and isobutylene; vinyl ethers, such as vinyl alkyl ether; vinyl chloride; and others, such as macro-monomers having a radically polymerizable vinyl group at the monomer end to which a vinyl group has been polymerized, etc. These monomers can be polymerized, alone or in combination thereof, with the aforementioned (meth)acrylic acid esters.

In the acrylic pressure-sensitive adhesive composition according to the present embodiment, examples of the (meth) acrylic polymer (B) include, for example: a copolymer of cyclohexyl methacrylate (CHMA) and isobutyl methacrylate (IBMA), that of cyclohexyl methacrylate (CHMA) and isobornyl methacrylate (IBXMA), that of cyclohexyl methacrylate (CHMA) and acryloyl morpholine (ACMO), that of cyclohexyl methacrylate (CHMA) and diethylacrylamide (DEAA), that of 1-adamantyl methacrylate (ADMA) and methyl methacrylate (MMA), that of dicyclopentanyl methacrylate (DCPMA) and methyl methacrylate (MMA), that of isobornyl methacrylate (IBXMA) and methyl methacrylate (MMA), and homopolymers of respective dicyclopentanyl methacrylate (DCPMA), dicyclopentanyl acrylate (DCPA), cyclohexyl methacrylate (CHMA), isobornyl methacrylate (IBXMA), and isobornyl acrylate (IBXA).

It is preferable that the (meth)acrylic polymer (B) includes, as a monomer unit, an acrylic monomer having a relatively bulky structure represented by: (meth)acrylate whose alkyl group has a branched structure, such as t-butyl(meth)acrylate; an ester of a (meth)acrylic acid, such as cyclohexyl(meth) acrylate, (meth)acrylic acid isobornyl, or the like, with an alicyclic alcohol; or (meth)acrylate having a cyclic structure, such as a (meth)acrylic acid aryl ester including (meth)acrylic acid phenyl or (meth)acrylic acid benzyl. By providing such a bulky structure to the (meth)acrylic polymer (B), the adhesiveness of the acrylic pressure-sensitive adhesive composition can be further improved. An acrylic monomer having a cyclic structure has a large effect in terms of bulkiness, and that having multiple cyclic structures has a larger effect. In addition, when UV polymerization is adopted in synthesizing the (meth)acrylic polymer (B) or in producing the pressure-sensitive adhesive composition, an acrylic monomer having a saturated bond is preferable in terms of hardly causing inhibition of polymerization, and (meth)acrylate whose alkyl group has a branched structure or an ester with an alicyclic alcohol can be preferably used as a monomer that forms the (meth)acrylic polymer (B).

The (meth)acrylic polymer (B) may also contain, as a monomer unit, an acrylic monomer having, for example, a tricyclic or higher alicyclic structure. By providing a bulky structure, such as a tricyclic or higher alicyclic structure, to the (meth)acrylic polymer (B), the adhesiveness of the acrylic pressure-sensitive adhesive composition can be further improved. In particular, the adhesiveness to a nonpolar adherend, such as polypropylene, can be improved more remarkably. The (meth)acrylic polymer (B) may be a homopolymer of the acrylic monomer having a tricyclic or higher alicyclic structure or a copolymer of the acrylic monomer having a tricyclic or higher alicyclic structure and either of the (meth) acrylic acid ester monomer and the copolymerizable monomer.

The acrylic monomer is, for example, a (meth)acrylic acid ester represented by the following general formula (3):

$$CH_2=C(R^4)COOR^5 \quad (3)$$

[wherein, $R^4$ is a hydrogen atom or methyl group and $R^5$ is an alicyclic hydrocarbon group having a tricyclic or higher alicyclic structure].

It is preferable that the alicyclic hydrocarbon group has a three-dimensional structure, such as a bridged ring structure. By providing a tricyclic or higher alicyclic structure having a bridged ring structure to the (meth)acrylic polymer (B), as stated above, the adhesiveness of the acrylic pressure-sensitive adhesive composition (acrylic pressure-sensitive adhesive tape) can be further improved. In particular, the adhesiveness to an adherend having low polarity, such as polyethylene and polypropylene, can be improved more remarkably. Examples of the alicyclic hydrocarbon group having a bridged ring structure include, for example, a dicyclopentanyl group represented by the following formula (3a), a dicyclopentenyl group represented by the following formula (3b), an adamantyl group represented by the following formula (3c), a tricyclopentanyl group represented by the following formula (3d), and a tricyclopentenyl group represented by the following formula (3e), etc. Among the (meth) acrylic monomers having a tricyclic or higher alicyclic structure containing a bridged ring structure, (meth)acrylic monomers having a saturated structure, such as the dicyclopentanyl group represented by the following formula (3a), the adamantyl group represented by the following formula (3c), and the tricyclopentanyl group represented by the following formula (3d), can be particularly and preferably used as a monomer that forms the (meth)acrylic polymer (B), in terms of hardly causing inhibition of polymerization, when UV polymerization is adopted in synthesizing the (meth)acrylic polymer (B) or in producing the pressure-sensitive adhesive composition.

[Formula 3]

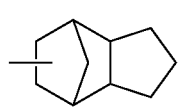

(3a)

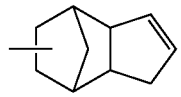

(3b)

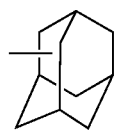

(3c)

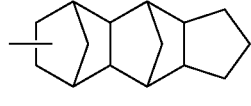

(3d)

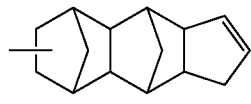

(3e)

Examples of the (meth)acrylic monomer having such a tricyclic or higher alicyclic structure containing a bridged ring structure include (meth)acrylic acid esters, such as dicyclopentanyl methacrylate, dicyclopentanyl acrylate, dicyclopentanyl oxyethyl methacrylate, dicyclopentanyl oxyethyl acrylate, tricyclopentanyl methacrylate, tricyclopentanyl acrylate, 1-adamantyl methacrylate, 1-adamantyl acrylate, 2-methyl-2-adamantyl methacrylate, 2-methyl-2-adamantyl acrylate, 2-ethyl-2-adamantyl methacrylate, and 2-ethyl-2-adamantyl acrylate. These (meth)acrylic monomers can be used alone or in combination of two or more thereof.

In the present embodiment, it is particularly preferable from the viewpoint of achieving high adhesiveness to various adherends that the (meth)acrylic polymer (B) is an ester of a (meth)acrylic acid, such as cyclohexyl(meth)acrylate or (meth)acrylic acid isobornyl, with an alicyclic alcohol or is a (meth)acrylic polymer formed by copolymerizing methyl methacrylate with a (meth)acrylic monomer having a tricyclic or higher alicyclic structure that is used as a major component.

A functional group reactive with an epoxy group or an isocyanate group may be further introduced into the (meth)acrylic polymer (B). Examples of such a functional group include a hydroxyl group, carboxyl group, amino group, amide group, and a mercapto group. When the (meth)acrylic polymer (B) is produced, it is preferable to use a monomer having such a functional group.

The weight average molecular weight of the (meth)acrylic polymer (B) is 1000 or more and less than 30000, preferably 1500 or more and less than 20000, and more preferably 2000 or more and less than 10000. If the molecular weight is 30000 or more, there are sometimes the cases where the effect of improving the pressure-sensitive adhesive force of the pressure-sensitive adhesive tape cannot be sufficiently obtained. Conversely, if the molecular weight is less than 1000, there are sometimes the cases where, because the molecular weight is too small, the pressure-sensitive adhesive force or holding property of the pressure-sensitive adhesive tape is decreased.

The weight average molecular weight can be determined by a GPC method in terms of polystyrene. Specifically, the weight average molecular weight can be measured by using HPLC8020 and two TSKgel GMH-Hs(20) as columns, which are made by Tosoh Corporation, and under conditions in which a tetrahydrofuran solvent is used and a flow rate is approximately 0.5 ml/min.

The content of the (meth)acrylic polymer (B) is preferably within a range of 2 to 70 parts by weight, and more preferably within a range of 5 to 50 parts by weight, based on 100 parts by weight of the acrylic polymer (A). If the (meth)acrylic polymer (B) is added in an amount more than 70 parts by weight, the elastic modulus of a pressure-sensitive adhesive layer formed of the acrylic pressure-sensitive adhesive composition according to the present embodiment becomes large, and hence there are sometimes the cases where the adhesiveness at a low-temperature is deteriorated or the pressure-sensitive adhesive force is not exerted even at room temperature. Conversely, if the addition amount thereof is less than 2 parts by weight, there are sometimes the cases where the effect of adding the (meth)acrylic polymer (B) cannot be obtained.

The glass transition temperature (Tg) of the (meth)acrylic polymer (B) is within a range of approximately 20° C. or higher to approximately 300° C. or lower, preferably within a range of approximately 30° C. or higher to approximately 300° C. or lower, and more preferably within a range of approximately 40° C. or higher to approximately 300° C. or lower. If the glass transition temperature (Tg) is lower than approximately 20° C., the cohesive force of the pressure-sensitive adhesive layer, at a temperature higher than or equal to room temperature, is decreased, and hence there are sometimes the cases where the holding property or the adhesiveness at a high-temperature is decreased. The glass transition temperatures of typical materials that can be used as the (meth)acrylic polymer (B) in the present embodiment are shown in Table 1. The glass transition temperatures shown there are nominal values described in documents or catalogs, etc., or values calculated based on the following Equation (4) (Fox Equation):

$$1/Tg = W1/Tg1 + W2/Tg2 + \cdots + Wn/Tgn \quad (4)$$

[wherein, Tg represents the glass transition temperature of the (meth)acrylic polymer (B) (unit: K), Tgi (i=1, 2, * * *, n) represents the glass transition temperature of a homopolymer that has been formed of a monomer i (unit: K), and Wi (i=1, 2, * * *, n) represents the weight fraction of the monomer i in the whole monomer components]. The above Equation (4) is adopted when the (meth)acrylic polymer (B) is formed of n types of monomer components of monomer 1, monomer 2, * * *, monomer n.

TABLE 1

| COMPOSITION OF (METH) ACRYLIC POLYMER (B) | Tg (° C.) | REMARKS |
|---|---|---|
| DCPMA | 175 | VALUE DESCRIBED IN DOCUMENTS, ETC. |
| DCPA | 120 | VALUE DESCRIBED IN DOCUMENTS, ETC. |
| IBXMA | 173 | VALUE DESCRIBED IN DOCUMENTS, ETC. |
| IBXA | 97 | VALUE DESCRIBED IN DOCUMENTS, ETC. |
| CHMA | 66 | VALUE DESCRIBED IN DOCUMENTS, ETC. |
| MMA | 105 | VALUE DESCRIBED IN DOCUMENTS, ETC. |
| ADMA | 250 | VALUE DESCRIBED IN DOCUMENTS, ETC. |
| ADA | 153 | VALUE DESCRIBED IN DOCUMENTS, ETC. |
| DCPMA/IBXMA40 | 174 | CALCULATED VALUE (BASED ON Fox EQUATION) |
| DCPMA/MMA40 | 144 | CALCULATED VALUE (BASED ON Fox EQUATION) |
| DCPMA/MMA60 | 130 | CALCULATED VALUE (BASED ON Fox EQUATION) |
| IBXMA/MMA60 | 130 | CALCULATED VALUE (BASED ON Fox EQUATION) |
| ADMA/MMA40 | 180 | CALCULATED VALUE (BASED ON Fox EQUATION) |
| ADA/MMA40 | 132 | CALCULATED VALUE (BASED ON Fox EQUATION) |

The abbreviations in Table 1 represent the following compounds.

DCPMA: Dicyclopentanyl Methacrylate

DCPA: Dicyclopentanyl Acrylate

IBXMA: Isobornyl Methacrylate

IBXA: Isobornyl Acrylate

CHMA: Cyclohexyl Methacrylate

MMA: Methyl Methacrylate

ADMA: 1-Adamantyl Methacrylate

ADA: 1-Adamantyl Acrylate

DCPMA/IBXMA 40: Copolymer of DCPMA 60 Parts by Weight and IBXMA 40 Parts by Weight DCPMA/MMA 40: Copolymer of DCPMA 60 Parts by Weight and MMA 40 Parts by Weight DCPMA/MMA 60: Copolymer of DCPMA 40 Parts by Weight and MMA 60 Parts by Weight IBXMA/MMA 60: Copolymer of IBXMA 40 Parts by Weight and MMA 60 Parts by Weight ADMA/MMA 40: Copolymer of ADMA 60 Parts by Weight and MMA 40 Parts by Weight ADA/MMA 40: Copolymer of ADA 60 Parts by Weight and MMA 40 Parts by Weight <Method of Producing (Meth)Acrylic Polymer (B)>

The (meth)acrylic polymer (B) can be produced by subjecting (meth)acrylic monomers each having the aforementioned structure to polymerization with the use of, for example, a solution polymerization method, bulk polymerization method, emulsion polymerization method, suspension polymerization, and block polymerization, etc.

<Method of Adjusting Molecular Weight of (Meth)Acrylic Polymer (B)>

In order to adjust the molecular weight of the (meth)acrylic polymer (B), a chain transfer agent can be used while the polymer (B) is being polymerized. Examples of the chain transfer agent to be used include: compounds having a mercapt group, such as octylmercaptan, t-nonyl mercaptan, dodecyl mercaptan, t-dodecyl mercaptan, mercaptoethanol, and α-thioglycerol; thioglycolic acid, methyl thioglycolate, ethyl thioglycolate, propyl thioglycolate, butyl thioglycolate, t-butyl thioglycolate, 2-ethylhexyl thioglycolate, octyl thioglycolate, isooctyl thioglycolate, decyl thioglycolate, dodecyl thioglycolate, thioglycolic acid ester of ethylene glycol, thioglycolic acid ester of neopentyl glycol, and thioglycolic acid ester of pentaerythritol. From the viewpoint of metallic corrosion, examples of particularly preferred chain transfer agent include α-thioglycerol, mercaptoethanol, methyl thioglycolate, ethyl thioglycolate, propyl thioglycolate, butyl thioglycolate, t-butyl thioglycolate, 2-ethylhexyl thioglycolate, octyl thioglycolate, and isooctyl thioglycolate.

The use amount of the chain transfer agent is not particularly limited, but the chain transfer agent is usually contained in an amount within a range of approximately 0.1 to approximately 20 parts by weight, preferably within a range of approximately 0.2 to approximately 15 parts by weight, and more preferably within a range of approximately 0.3 to approximately 10 parts by weight, based on 100 parts by weight of the (meth)acrylic monomer. By adjusting the addition amount of the chain transfer agent, as stated above, a (meth)acrylic polymer (B) having a preferred molecular weight can be obtained. The chain transfer agent can be used alone or in combination of two or more thereof.

The acrylic pressure-sensitive adhesive composition according to the present embodiment contains the aforementioned acrylic polymer (A) and (meth)acrylic polymer (B) as essential components, and can contain, as optional components, various additives that are generally used in the field of pressure-sensitive adhesive compositions. A plasticizer, softener, filler, colorant (pigment, dye, or the like), antioxidant, silane coupling agent, leveling agent, stabilizer, and antiseptic, etc., are exemplified as such optional components. Such additives that are conventionally and publicly known can be used by ordinary methods.

Subsequently, the structure of an acrylic pressure-sensitive adhesive tape for optical use (or acrylic pressure-sensitive adhesive sheet for optical use) having a pressure-sensitive adhesive layer containing an acrylic pressure-sensitive adhesive composition for optical use with the aforementioned composition, will be described.

The acrylic pressure-sensitive adhesive tape for optical use according to the present embodiment comprises a pressure-sensitive adhesive layer containing an acrylic pressure-sensitive adhesive composition for optical use. The acrylic pressure-sensitive adhesive tape for optical use may be a so-called pressure-sensitive adhesive tape comprising a substrate, in which such a pressure-sensitive adhesive layer is provided on one or both surfaces of a sheet-shaped substrate (supporting body) in a fixed manner, i.e., without an intention of separating the pressure-sensitive adhesive layer from the substrate; or may be a so-called substrate-less pressure-sensitive adhesive tape in which the pressure-sensitive adhesive layer is provided on a substrate having a release property, such as a release liner (release paper, resin sheet whose surface has been subjected to a release treatment, or the like), so that the substrate for supporting the pressure-sensitive adhesive layer is removed when the tape is attached. The concept of the pressure-sensitive adhesive tape described herein can involve objects referred to as a pressure-sensitive adhesive sheet, pressure-sensitive adhesive label, and pressure-sensitive adhesive film, etc. The pressure-sensitive adhesive layer should not be limited to one continuously formed, but may be one formed into a regular pattern, such as, for example, a dot shape and a stripe shape, or formed into a random pattern.

The aforementioned substrate can be formed of a material appropriately selected, in accordance with the application of the pressure-sensitive adhesive tape, from the group consisting of, for example: plastic films including both polyester films, such as a polypropylene film, ethylene-propylene copolymer film, polyethylene terephthalate film, and polyethylene naphthalate film, and polyvinylchloride film, etc.; foam substrates, such as a polyurethane foam and polyethylene foam; paper, such as craft paper, crepe paper, and Japanese paper; cloth, such as cotton cloth and staple fiber cloth; nonwoven cloth, such as polyester nonwoven fabric and vinylon nonwoven fabric; metallic foils, such as aluminum foil and copper foil; and the like. As the aforementioned plastic films, both of a non-oriented film and an oriented (uniaxially oriented or biaxially oriented) film can be used. The surface of the substrate on which the pressure-sensitive adhesive layer is to be provided may be coated with a primer or be subject to a surface treatment, such as a corona discharge treatment. The thickness of the substrate can be appropriately selected in accordance with the purpose, but is generally within a range of approximately 10 μm to approximately 500 μm (typically within a range of 10 μm to 200 μm).

The pressure-sensitive adhesive layer can be a layer in which the acrylic pressure-sensitive adhesive composition for optical use has been cured. That is, the pressure-sensitive adhesive layer can be formed by providing the acrylic pressure-sensitive adhesive composition for optical use to an appropriate substrate (e.g., coating) and then by appropriately subjecting the composition to a curing treatment. When two or more types of curing treatments (drying, cross-link formation, polymerization, etc.) are performed, these treatments can be performed simultaneously or in multiple stages. In the case of the pressure-sensitive adhesive composition in which a partial polymer (acrylic polymer syrup) has been used, a final copolymerization reaction is typically performed as the curing treatment (the partial polymer is subjected to a further copolymerization reaction to form a complete polymer). For example, in the case of a photo-curing pressure-sensitive adhesive composition, light radiation is performed. A curing treatment, such as cross-link formation, drying, or the like, may be performed, if necessary. For example, when a photo-curing pressure-sensitive adhesive composition needs to be dried, light radiation may be performed after the drying of the composition. In the case of the pressure-sensitive adhesive composition in which a complete polymer has been used, a treatment, such as drying (drying by heating), cross-link formation, or the like, is typically performed as the curing treatment, if necessary.

Coating of the acrylic pressure-sensitive adhesive composition for optical use can be performed by using a commonly-used coater, such as, for example, a gravure roll coater, reverse roll coater, kiss roll coater, dip roll coater, bar coater, knife coater, spray coater, or the like. In the case of the pressure-sensitive adhesive tape comprising a substrate, a pressure-sensitive adhesive layer may be formed by directly providing a pressure-sensitive adhesive composition to the substrate, or a pressure-sensitive adhesive layer formed on a release liner may be transferred to the substrate.

The thickness of the pressure-sensitive adhesive layer is not particularly limited, but is usually larger than or equal to, for example, approximately 10 μm, preferably larger than or equal to approximately 20 μm, and more preferably larger than or equal to approximately 30 μm. Thereby, sufficient adhesiveness can be achieved. The thickness of the pressure-sensitive adhesive layer is appropriately set to be, for example, within a range of approximately 10 to approximately 250 μm.

The acrylic pressure-sensitive adhesive tape for optical use according to the present embodiment can be preferably used in the application in which various optical members are attached to, for example, liquid crystal cells, optical polyester films, and touch panel members, etc. Accordingly, the technique described herein includes a laminated body in which the pressure-sensitive adhesive layer including the acrylic pressure-sensitive adhesive composition for optical use is provided in the optical member. This laminated body typically has an aspect in which the pressure-sensitive adhesive layer on the optical member is protected by a release liner. The optical member in which such a pressure-sensitive adhesive layer is provided can be easily attached to, for example, the surface, etc., of a plastic cover lens panel, glass, or liquid crystal cell.

The aforementioned optical member means a member having an optical property (e.g., polarization property, photorefractivity, light scattering property, light reflecting property, optical transparency, light absorption property, light diffraction property, optical rotation property, visibility, or the like). The optical member is not particularly limited as far as the member has an optical property. Examples of the optical member include, for example, members that form optical products, such as display devices (image display devices) and input devices, or members to be used in these devices (optical products). For example, a polarizing plate, wavelength plate, retardation plate, optical compensation film, brightness enhancement film, light guide plate, reflective film, anti-reflection film, transparent conductive film (ITO film, etc.), design film, decorative film, surface protection plate, prism, lens, color filter, transparent substrate, and members on which these are laminated (they are sometimes and collectively referred to as "functional films") can be exemplified as the optical member. The aforementioned "plate" and "film" are respectively defined to include a plate-shaped form, film-shaped form, and sheet-shaped form, and, for example, the "polarizing film" includes a "polarizing plate" and "polarizing sheet". Also, the "functional film" is defined to include a "functional plate" and "functional sheet".

As a method of forming the pressure-sensitive adhesive layer on the optical member, a method of directly providing the pressure-sensitive adhesive layer thereto or a method of transferring the pressure-sensitive adhesive layer thereto can be appropriately adopted, in the same way as in the case where the pressure-sensitive adhesive layer is formed on a substrate. Typically, the pressure-sensitive adhesive layer formed on a release liner is transferred to the base surface of the optical member.

Figure 2:
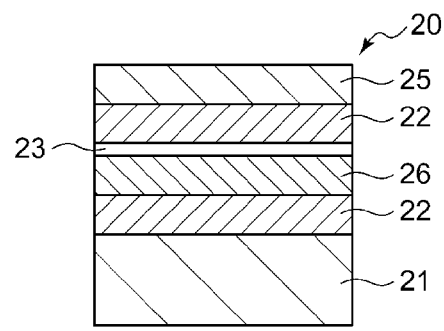
FIG. 2 is a schematic sectional view illustrating part of a display device in which an acrylic pressure-sensitive adhesive tape for optical use according to an embodiment has been used.
Figure 3:
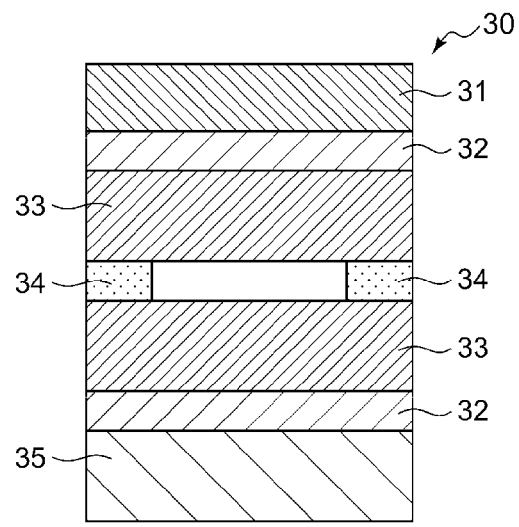
FIG. 3 is a schematic sectional view illustrating part of a display device in which an acrylic pressure-sensitive adhesive tape for optical use according to an embodiment has been used.

Subsequently, the structure of a display device comprising a touch panel in which the aforementioned acrylic pressure-sensitive adhesive tape for optical use has been used will be described. FIG. 1 is a schematic sectional view illustrating part of a display device in which the acrylic pressure-sensitive adhesive tape for optical use according to the present embodiment has been used. FIG. 2 is a schematic sectional view illustrating part of a display device in which the acrylic pressure-sensitive adhesive tape for optical use according to the present embodiment has been used. FIG. 3 is a schematic sectional view illustrating part of a display device in which the acrylic pressure-sensitive adhesive tape for optical use according to the present embodiment has been used.

As illustrated in FIG. 1, a display devices 10 as an example is a flat panel display, such as a liquid crystal display (LCD), and a capacitive touch panel is provided thereon. Specifically, the display device 10 has an image display panel 11 and an acrylic pressure-sensitive adhesive tape for optical use 12 according to the present embodiment is laminated on the surface of the image display panel 11. The acrylic pressure-sensitive adhesive tape for optical use 12 illustrated in FIG. 1 is a substrate-less double-sided pressure-sensitive adhesive tape formed only of a pressure-sensitive adhesive layer. A glass plate 14 is laminated on the acrylic pressure-sensitive adhesive tape for optical use 12. A transparent conductive film 13 made of ITO (Indium-Tin Oxide: oxide of indium and tin) is formed on the surface of the glass plate 14, the surface being opposite to the other surface of the glass plate 14 that is in contact with the acrylic pressure-sensitive adhesive tape for optical use 12, and the capacitive touch panel is formed by the transparent conductive film 13 and the glass plate 14. The touch panel is attached to the image display panel 11 with the acrylic pressure-sensitive adhesive tape for optical use 12. The acrylic pressure-sensitive adhesive tape for optical use 12 according to the present embodiment is laminated on the surface of the transparent conductive film 13. A protective film 15 made of a polycarbonate plate, acrylic plate, or the like, is laminated on the acrylic pressure-sensitive adhesive tape for optical use 12. The protective panel 15 is attached to the transparent conductive film 13 with the acrylic pressure-sensitive adhesive tape for optical use 12.

As illustrated in FIG. 2, a display device 20 as another example comprises a capacitive touch panel in the same way as in the aforementioned display device 10, and has a structure in which the glass plate 14 in the display device 10 has been replaced by a PET film 26. That is, in the display device 20, the PET film 26 is attached to the surface of an image display device 21 via an acrylic pressure-sensitive adhesive tape for optical use 22 according to the present embodiment. A transparent conductive film 23 is formed on the surface of the PET film 26 and the capacitive touch panel is formed by the transparent conductive film 23 and the PET film 26. A protective panel 25 is attached to the surface of the transparent conductive film 23 via the acrylic pressure-sensitive adhesive tape for optical use 22.

Because the acrylic pressure-sensitive adhesive tape for optical use according to the present embodiment is formed of the acrylic polymer (A) that does not substantially contain an acid, it can be prevented that the transparent conductive films 13, 23 may corrode in the state where the films are laminated on the surface of the transparent conductive films 13, 23, respectively. The acrylic pressure-sensitive adhesive tape for optical use according to the present embodiment can also be used when, in a capacitive touch panel, for example, a polymethyl methacrylate (PMMA) plate is attached onto the surface of a transparent conductive PET film in which a silver paste electrode (height: 8-10 μm) is provided.

As illustrated in FIG. 3, a resistive touch panel is provided in a display device 30 as still another example. Specifically, the display device 30 has two transparent conductive polyethylene terephthalate (PET) films 33 on the surface of each of which a transparent conductive film made of ITO (not illustrated) has been formed. These two transparent conductive PET films 33 are arranged in a state where the surfaces of the films, each of which the transparent conductive film has been formed on, face each other such that a conductive layer 34 is sandwiched by the two. A PET film 31 on which design printing has been performed is attached outside one of the transparent conductive PET films 33 via an acrylic pressure-sensitive adhesive tape for optical use 32 according to the present embodiment. A resin plate 35 made of, for example, a polycarbonate plate, acrylic plate, or the like, is attached outside the other transparent conductive PET film 33 via the acrylic pressure-sensitive adhesive tape for optical use 32.

As described above, the acrylic pressure-sensitive adhesive composition for optical use according to the present embodiment comprises: the (meth)acrylic polymer (A) that contains, as a monomer unit, a vinyl monomer having a nitrogen atom in its backbone and that does not substantially contain a carboxyl group-containing monomer; and the (meth)acrylic polymer (B) having a weight average molecular weight of 1000 or more and less than 30000. Thereby, the acrylic pressure-sensitive adhesive composition for optical use can be provided with high transparency, high adhesiveness, and low corrosiveness.

EXAMPLES

Hereinafter, the present invention will be described in detail based on Examples, but the invention should not be limited at all by these Examples.

Components of the acrylic pressure-sensitive adhesive compositions for optical use according to Examples 1 to 9 and Comparative Examples 1 to 8 are shown in Table 2.

TABLE 2

| | | (METH)ACRYLIC POLYMER (B) | | | | |
|---|---|---|---|---|---|---|
| | ACRYLIC POLYMER (A) COMPOSITION RATIO (100 PARTS BY WEIGHT) | TYPE | NUMBER OF ADDED PARTS (BASED ON 100 PARTS BY WEIGHT OF ACRYLIC POLYMER (A)) | OLIGOMER | CHAIN TRANSFER AGENT | SILANE COUPLING AGENT |
| EXAMPLE 1 | 2EHA/NVP = 86/14 | DCPMA | 20 PARTS BY WEIGHT | ACRYLIC POLYMER 1 | THIOGLYCOLIC ACID (GSH ACID) | — |
| EXAMPLE 2 | 2EHA/NVP = 86/14 | DCPMA | 10 PARTS BY WEIGHT | ACRYLIC POLYMER 1 | THIOGLYCOLIC ACID (GSH ACID) | — |
| EXAMPLE 3 | 2EHA/2MEA/NVP/HEAA/HEA = 70/10/8/2/10 | DCPMA/MMA40 | 30 PARTS BY WEIGHT | ACRYLIC POLYMER 2 | THIOGLYCOLIC ACID (GSH ACID) | — |
| EXAMPLE 4 | 2EHA/NVP/HEA = 78/18/4 | ADMA/MMA40 | 20 PARTS BY WEIGHT | ACRYLIC POLYMER 6 | THIOGLYCOLIC ACID (GSH ACID) | — |
| EXAMPLE 5 | 2EHA/NVP/HEA = 78/18/4 | DCPMA/MMA40 | 20 PARTS BY WEIGHT | ACRYLIC POLYMER 2 | THIOGLYCOLIC ACID (GSH ACID) | — |
| EXAMPLE 6 | 2EHA/NVP/HEA = 70/16/14 | DCPMA/MMA40 | 10 PARTS BY WEIGHT | ACRYLIC POLYMER 2 | THIOGLYCOLIC ACID (GSH ACID) | — |
| EXAMPLE 7 | 2EHA/NVP/HEA = 70/16/14 | DCPMA/MMA40 | 15 PARTS BY WEIGHT | ACRYLIC POLYMER 2 | THIOGLYCOLIC ACID (GSH ACID) | — |
| EXAMPLE 8 | 2EHA/NVP/HEA = 70/16/14 | DCPMA/MMA60 | 20 PARTS BY WEIGHT | ACRYLIC POLYMER 3 | THIOGLYCOLIC ACID (GSH ACID) | — |
| EXAMPLE 9 | 2EHA/NVP/HEA = 70/16/14 | IBXMA/MMA60 | 20 PARTS BY WEIGHT | ACRYLIC POLYMER 7 | THIOGLYCOLIC ACID (GSH ACID) | — |
| EXAMPLE 10 | 2EHA/NVP/HEA = 67/15/18 | DCPMA/MMA40 | 5 PARTS BY WEIGHT | ACRYLIC POLYMER 11 | METHYL THIOGLYCOLATE (TGAM) | 0.3 PARTS BY WEIGHT |
| EXAMPLE 11 | 2EHA/NVP/HEA = 67/15/18 | DCPMA/MMA40 | 3 PARTS BY WEIGHT | ACRYLIC POLYMER 12 | ETHYL THIOGLYCOLATE (TGAE) | 0.3 PARTS BY WEIGHT |
| EXAMPLE 12 | 2EHA/NVP/HEA = 67/15/18 | DCPMA/MMA40 | 4 PARTS BY WEIGHT | ACRYLIC POLYMER 13 | a-THIOGLYCEROL (TGR) | 0.3 PARTS BY WEIGHT |
| EXAMPLE 13 | 2EHA/NVP/HEA = 67/15/18 | DCPMA/MMA40 | 5 PARTS BY WEIGHT | ACRYLIC POLYMER 13 | a-THIOGLYCEROL (TGR) | 1 PARTS BY WEIGHT |
| EXAMPLE 14 | 2EHA/NVP/HEA/HBA = 67/15/3/15 | DCPMA/MMA40 | 5 PARTS BY WEIGHT | ACRYLIC POLYMER 13 | a-THIOGLYCEROL (TGR) | 0.3 PARTS BY WEIGHT |
| COMPARATIVE EXAMPLE 1 | 2EHA/NVP = 86/14 | — | — | — | — | — |
| COMPARATIVE EXAMPLE 2 | 2EHA/NVP/HEA = 78/18/4 | — | — | — | — | — |
| COMPARATIVE EXAMPLE 3 | 2EHA/AA = 94/6 | DCPMA | 20 PARTS BY WEIGHT | ACRYLIC POLYMER 1 | THIOGLYCOLIC ACID (GSH ACID) | — |
| COMPARATIVE EXAMPLE 4 | 2EHA/AA = 94/6 | DCPMA低 | 20 PARTS BY WEIGHT | ACRYLIC POLYMER 4 | THIOGLYCOLIC ACID (GSH ACID) | — |
| COMPARATIVE EXAMPLE 5 | 2EHA/AA = 94/6 | DCPA | 20 PARTS BY WEIGHT | ACRYLIC POLYMER 5 | LAURYL MERCAPTAN (LSH) | — |
| COMPARATIVE EXAMPLE 6 | 2EHA/AA = 94/6 | CHMA | 20 PARTS BY WEIGHT | ACRYLIC POLYMER 8 | 2-MERCAPTOETHANOL (GSH) | — |
| COMPARATIVE EXAMPLE 7 | 2EHA/AA = 94/6 | IBXMA | 20 PARTS BY WEIGHT | ACRYLIC POLYMER 9 | 2-MERCAPTOETHANOL (GSH) | — |
| COMPARATIVE EXAMPLE 8 | 2EHA/AA = 94/6 | IBXA | 20 PARTS BY WEIGHT | ACRYLIC POLYMER 10 | 2-MERCAPTOETHANOL (GSH) | — |

The abbreviations in Table 2 represent the following compounds.
  2EHA: 2-Ethylhexyl Acrylate
  NVP: N-vinyl-2-pyrrolidone
  2MEA: 2-Methoxyethyl Acrylate
  HEAA: N-Hydroxyethyl acrylamide
  HEA: Hydroxyethyl Acrylate
  AA: Acrylic Acid
  DCPMA: Dicyclopentanyl Methacrylate
  MMA: Methyl Methacrylate
  ADMA: 1-Adamantyl Methacrylate
  IBXMA: Isobornyl Methacrylate
  DCPMA Low: Dicyclopentanyl Methacrylate having a polymerization degree lower than that of DCPMA (Examples 1-3 and 5-8, Comparative Example 3)
  DCPA: Dicyclopentanyl Acrylate
  CHMA: Cyclohexyl Methacrylate
  IBXA: Isobornyl Acrylate (Preparation of (Meth)Acrylic Polymer 1 (DCPMA) as (B) Component)

One hundred parts by weight of toluene, 100 parts by weight of dicyclopentanyl methacrylate (DCPMA) (product name: FA-513M, made by Hitachi Chemical Co., Ltd.), and 3 parts by weight of thioglycolic acid (GSH acid), as a chain transfer agent, were placed into a 4-neck flask. After they were stirred under a nitrogen atmosphere at 70° C. for 1 hour, 0.2 parts by weight of azobisisobutyronitrile were placed therein as a thermal polymerization initiator to react with them at 70° C. for 2 hours, and subsequently they were reacted together at 80° C. for 2 hours. Thereafter, the reaction liquid was placed under a temperature atmosphere of 130° C. to dry and remove the toluene, chain transfer agent, and unreacted monomer, thereby allowing a solid (meth)acrylic polymer 1 to be obtained. The glass transition temperature of the obtained (meth)acrylic polymer 1 was 175° C. and the weight average molecular weight thereof was 4600.

(Preparation of (Meth)Acrylic Polymer 2 (DCPMA/MMA 40) as (B) Component)

One hundred parts by weight of toluene, 60 parts by weight of dicyclopentanyl methacrylate (DCPMA) (product name: FA-513M, made by Hitachi Chemical Co., Ltd.), 40 parts by weight of methyl methacrylate, and 3 parts by weight of thioglycoric acid (GSH acid), as a chain transfer agent, were placed into a 4-neck flask. After they were stirred under a nitrogen atmosphere at 70° C. for 1 hour, 0.2 parts by weight of azobisisobutyronitrile were placed therein as a thermal polymerization initiator to react with them at 70° C. for 2 hours, and subsequently they were reacted together at 80° C. for 2 hours. Thereafter, the reaction liquid was placed under a temperature atmosphere of 130° C. to dry and remove the toluene, chain transfer agent, and unreacted monomer, thereby allowing a solid (meth)acrylic polymer 2 to be obtained. The glass transition temperature of the obtained (meth)acrylic polymer 2 was 144° C. and the weight average molecular weight thereof was 5500.

(Preparation of (Meth)Acrylic Polymer 3 (DCPMA/MMA 60) as (B) Component)

One hundred parts by weight of toluene, 40 parts by weight of dicyclopentanyl methacrylate (DCPMA) (product name: FA-513M, made by Hitachi Chemical Co., Ltd.), 60 parts by weight of methyl methacrylate (MMA), and 3 parts by weight of thioglycolic acid (GSH acid), as a chain transfer agent, were placed into a 4-neck flask. After they were stirred under a nitrogen atmosphere at 70° C. for 1 hour, 0.2 parts by weight of azobisisobutyronitrile were placed therein as a thermal polymerization initiator to react with them at 70° C. for 2 hours, and subsequently they were reacted together at 80° C. for 2 hours. Thereafter, the reaction liquid was placed under a temperature atmosphere of 130° C. to dry and remove the toluene, chain transfer agent, and unreacted monomer, thereby allowing a solid (meth)acrylic polymer 3 to be obtained. The glass transition temperature of the obtained (meth)acrylic polymer 3 was 130° C. and the weight average molecular weight thereof was 5400.

(Preparation of (Meth)Acrylic Polymer 4 (DCPMA Low) as (B) Component)

One hundred parts by weight of toluene, 100 parts by weight of dicyclopentanyl methacrylate (DCPMA) (product name: FA-513M, made by Hitachi Chemical Co., Ltd.), and 5 parts by weight of thioglycolic acid (GSH acid), as a chain transfer agent, were placed into a 4-neck flask. After they were stirred under a nitrogen atmosphere at 75° C. for 1 hour, 0.2 parts by weight of azobisisobutyronitrile were placed therein as a thermal polymerization initiator to react with them at 75° C. for 2 hours, and subsequently they were reacted together at 80° C. for 2 hours. Thereafter, the reaction liquid was placed under a temperature atmosphere of 130° C. to dry and remove the toluene, chain transfer agent, and unreacted monomer, thereby allowing a solid (meth)acrylic polymer 4 to be obtained. The glass transition temperature of the obtained (meth)acrylic polymer 4 was 175° C. and the weight average molecular weight thereof was 3000.

(Preparation of (Meth)Acrylic Polymer 5 (DCPA) as (B) Component)

One hundred parts by weight of toluene, 100 parts by weight of dicyclopentanyl acrylate (DCPA) (product name: FA-513AS, made by Hitachi Chemical Co., Ltd.), and 8 parts by weight of lauryl mercaptan (LSH), as a chain transfer agent, were placed into a 4-neck flask. After they were stirred under a nitrogen atmosphere at 70° C. for 1 hour, 0.2 parts by weight of azobisisobutyronitrile were placed therein as a thermal polymerization initiator to react with them at 70° C. for 2 hours, and subsequently they were reacted together at 80° C. for 2 hours. Thereafter, the reaction liquid was placed under a temperature atmosphere of 130° C. to dry and remove the toluene, chain transfer agent, and unreacted monomer, thereby allowing a solid (meth)acrylic polymer 5 to be obtained. The glass transition temperature of the obtained (meth)acrylic polymer 5 was 120° C. and the weight average molecular weight thereof was 3600.

(Preparation of (Meth)Acrylic Polymer 6 (ADMA/MMA 40) as (B) Component)

One hundred parts by weight of toluene, 60 parts by weight of 1-adamantyl methacrylate (ADMA), 40 parts by weight of methyl methacrylate (MMA), and 3 parts by weight of thioglycoric acid (GSH acid), as a chain transfer agent, were placed into a 4-neck flask. After they were stirred under a nitrogen atmosphere at 70° C. for 1 hour, 0.2 parts by weight of azobisisobutyronitrile were placed therein as a thermal polymerization initiator to react with them at 70° C. for 2 hours, and subsequently they were reacted together at 80° C. for 2 hours. Thereafter, the reaction liquid was placed under a temperature atmosphere of 130° C. to dry and remove the toluene, chain transfer agent, and unreacted monomer, thereby allowing a solid (meth)acrylic polymer 6 to be obtained. The glass transition temperature of the obtained (meth)acrylic polymer 6 was 180° C. and the weight average molecular weight thereof was 7100.

(Preparation of (Meth)Acrylic Polymer 7 (IBXMA/MMA 60) as (B) Component)

One hundred parts by weight of toluene, 40 parts by weight of isobornyl methacrylate (IBXMA), 60 parts by weight of methyl methacrylate (MMA), and 3 parts by weight of thioglycolic acid (GSH acid), as a chain transfer agent, were placed into a 4-neck flask. After they were stirred under a nitrogen atmosphere at 70° C. for 1 hour, 0.2 parts by weight of azobisisobutyronitrile were placed therein as a thermal polymerization initiator to react with them at 70° C. for 2 hours, and subsequently they were reacted together at 80° C. for 2 hours. Thereafter, the reaction liquid was placed under a temperature atmosphere of 130° C. to dry and remove the toluene, chain transfer agent, and unreacted monomer, thereby allowing a solid (meth)acrylic polymer 7 to be obtained. The glass transition temperature of the obtained (meth)acrylic polymer 7 was 130° C. and the weight average molecular weight thereof was 5600.

(Preparation of (Meth)Acrylic Polymer 8 (CHMA) as (B) Component)

One hundred parts by weight of toluene, 100 parts by weight of cyclohexyl methacrylate (CHMA), and 3 parts by weight of 2-mercaptoethanol (thioglycol, GSH), as a chain transfer agent, were placed into a 4-neck flask. After they were stirred under a nitrogen atmosphere at 70° C. for 1 hour, 0.2 parts by weight of azobisisobutyronitrile were placed therein as a thermal polymerization initiator to react with them at 70° C. for 2 hours, and subsequently they were reacted together at 80° C. for 2 hours. Thereafter, the reaction liquid was placed under a temperature atmosphere of 130° C. to dry and remove the toluene, chain transfer agent, and unreacted monomer, thereby allowing a solid (meth)acrylic polymer 8 to be obtained. The glass transition temperature of the obtained (meth)acrylic polymer 8 was 66° C. and the weight average molecular weight thereof was 3700.

(Preparation of (Meth)Acrylic Polymer 9 (IBXMA) as (B) Component)

One hundred parts by weight of toluene, 100 parts by weight of isobornyl methacrylate (IBXMA), and 3 parts by weight of 2-mercaptoethanol (thioglycol, GSH), as a chain transfer agent, were placed into a 4-neck flask. After they were stirred under a nitrogen atmosphere at 70° C. for 1 hour, 0.2 parts by weight of azobisisobutyronitrile were placed therein as a thermal polymerization initiator to react with them at 70° C. for 2 hours, and subsequently they were reacted together at 80° C. for 2 hours. Thereafter, the reaction liquid was placed under a temperature atmosphere of 130° C. to dry and remove the toluene, chain transfer agent, and unreacted monomer, thereby allowing a solid (meth)acrylic polymer 9 to be obtained. The glass transition temperature of the obtained (meth)acrylic polymer 9 was 173° C. and the weight average molecular weight thereof was 3100.

(Preparation of (Meth)Acrylic Polymer 10 (IBXA) as (B) Component)

One hundred parts by weight of toluene, 100 parts by weight of isobornyl acrylate (IBXA), and 3 parts by weight of 2-mercaptoethanol (thioglycol, GSH), as a chain transfer agent, were placed into a 4-neck flask. After they were stirred under a nitrogen atmosphere at 70° C. for 1 hour, 0.2 parts by weight of azobisisobutyronitrile were placed therein as a thermal polymerization initiator to react with them at 70° C. for 2 hours, and subsequently they were reacted together at 80° C. for 2 hours. Thereafter, the reaction liquid was placed under a temperature atmosphere of 130° C. to dry and remove the toluene, chain transfer agent, and unreacted monomer, thereby allowing a solid (meth)acrylic polymer 10 to be obtained. The glass transition temperature of the obtained (meth)acrylic polymer 10 was 97° C. and the weight average molecular weight thereof was 3300.

(Preparation of (Meth)Acrylic Polymer 11 (DCPMA/MMA 40) as (B) Component)

One hundred parts by weight of toluene, 60 parts by weight of dicyclopentanyl methacrylate (DCPMA) (product name: FA-513M, made by Hitachi Chemical Co., Ltd.), 40 parts by weight of methyl methacrylate (MMA), and 4.5 parts by weight of methyl thioglycolate (TGAM), as a chain transfer agent, were placed into a 4-neck flask. After they were stirred under a nitrogen atmosphere at 70° C. for 1 hour, 0.2 parts by weight of azobisisobutyronitrile were placed therein as a thermal polymerization initiator to react with them at 70° C. for 2 hours, and subsequently they were reacted together at 80° C. for 2 hours. Thereafter, the reaction liquid was placed under a temperature atmosphere of 130° C. to dry and remove the toluene, chain transfer agent, and unreacted monomer, thereby allowing a solid (meth)acrylic polymer 11 to be obtained. The glass transition temperature of the obtained (meth)acrylic polymer 11 was 144° C. and the weight average molecular weight thereof was 2800.

(Preparation of (Meth)Acrylic Polymer 12 (DCPMA/MMA 40) as (B) Component)

One hundred parts by weight of toluene, 60 parts by weight of dicyclopentanyl methacrylate (DCPMA) (product name: FA-513M, made by Hitachi Chemical Co., Ltd.), 40 parts by weight of methyl methacrylate (MMA), and 5 parts by weight of ethyl thioglycolate (TGAE), as a chain transfer agent, were placed into a 4-neck flask. After they were stirred under a nitrogen atmosphere at 70° C. for 1 hour, 0.2 parts by weight of azobisisobutyronitrile were placed therein as a thermal polymerization initiator to react with them at 70° C. for 2 hours, and subsequently they were reacted together at 80° C. for 2 hours. Thereafter, the reaction liquid was placed under a temperature atmosphere of 130° C. to dry and remove the toluene, chain transfer agent, and unreacted monomer, thereby allowing a solid (meth)acrylic polymer 12 to be obtained. The glass transition temperature of the obtained (meth)acrylic polymer 12 was 144° C. and the weight average molecular weight thereof was 3100.

(Preparation of (Meth)Acrylic Polymer 13 (DCPMA/MMA 40) as (B) Component)

One hundred parts by weight of toluene, 60 parts by weight of dicyclopentanyl methacrylate (DCPMA) (product name: FA-513M, made by Hitachi Chemical Co., Ltd.), 40 parts by weight of methyl methacrylate (MMA), and 3.5 parts by weight of α-thioglycerol (TGR), as a chain transfer agent, were placed into a 4-neck flask. After they were stirred under a nitrogen atmosphere at 70° C. for 1 hour, 0.2 parts by weight of azobisisobutyronitrile were placed therein as a thermal polymerization initiator to react with them at 70° C. for 2 hours, and subsequently they were reacted together at 80° C. for 2 hours. Thereafter, the reaction liquid was placed under a temperature atmosphere of 130° C. to dry and remove the toluene, chain transfer agent, and unreacted monomer, thereby allowing a solid (meth)acrylic polymer 13 to be obtained. The glass transition temperature of the obtained (meth)acrylic polymer 13 was 144° C. and the weight average molecular weight thereof was 4300.

(Preparation of Acrylic Polymer Syrup 1 (2EHA/NVP=86/14) as (A) Component)

Eighty six parts by weight of 2-ethylhexyl acrylate (2EHA), 14 parts by weight of N-vinyl-2-pyrrolidone (NVP), 0.05 parts by weight of a photo-polymerization initiator (product name: IRGACURE 184, made by Ciba Speciality Chemicals Inc.), and 0.05 parts by weight of a photo-polymerization initiator (product name: IRGACURE 651, made by Ciba Speciality Chemicals Inc.) were placed into a 4-neck flask. A partial polymer (acrylic polymer syrup 1) having a rate of polymerization of approximately 11% by weight was obtained by exposing the mixture to UV rays under a nitrogen atmosphere such that the mixture was partially photopolymerized.

(Preparation of Acrylic Polymer Syrup 2 (2EHA/2MEA/NVP/HEAA/HEA=70/10/8/2/10) as (A) Component)

Seventy parts by weight of 2-ethylhexyl acrylate (2EHA), 10 parts by weight of 2-methoxyethyl acrylate (2MEA), 8 parts by weight of N-vinyl-2-pyrrolidone (NVP), 2 parts by weight of N-hydroxyethyl acrylic amide (HEAA), 10 parts by weight of hydroxyethyl acrylate (HEA), 0.05 parts by weight of a photo-polymerization initiator (product name: IRGACURE 184, made by Ciba Speciality Chemicals Inc.), and 0.05 parts by weight of a photo-polymerization initiator (product name: IRGACURE 651, made by Ciba Speciality Chemicals Inc.) were placed into a 4-neck flask. A partial polymer (acrylic polymer syrup 2) having a rate of polymerization of approximately 10% by weight was obtained by exposing the mixture to UV rays under a nitrogen atmosphere such that the mixture was partially photopolymerized.

(Preparation of Acrylic Polymer Syrup 3 (2EHA/NVP/HEA=78/18/4) as (A) Component)

Seventy eight parts by weight of 2-ethylhexyl acrylate (2EHA), 18 parts by weight of N-vinyl-2-pyrrolidone (NVP), 4 parts by weight of hydroxyethyl acrylate (HEA), 0.05 parts by weight of a photo-polymerization initiator (product name: IRGACURE 184, made by Ciba Speciality Chemicals Inc.), and 0.05 parts by weight of a photo-polymerization initiator (product name: IRGACURE 651, made by Ciba Speciality Chemicals Inc.) were placed into a 4-neck flask. A partial polymer (acrylic polymer syrup 3) having a rate of polymerization of approximately 10% by weight was obtained by exposing the mixture to UV rays under a nitrogen atmosphere such that the mixture was partially photopolymerized.

(Preparation of Acrylic Polymer Syrup 4 (2EHA/NVP/HEA=70/16/14) as (A) Component)

Seventy parts by weight of 2-ethylhexyl acrylate (2EHA), 16 parts by weight of N-vinyl-2-pyrrolidone (NVP), 14 parts by weight of hydroxyethyl acrylate (HEA), 0.05 parts by weight of a photo-polymerization initiator (product name: IRGACURE 184, made by Ciba Speciality Chemicals Inc.), and 0.05 parts by weight of a photo-polymerization initiator (product name: IRGACURE 651, made by Ciba Speciality Chemicals Inc.) were placed into a 4-neck flask. A partial polymer (acrylic polymer syrup 4) having a rate of polymerization of approximately 10% by weight was obtained by exposing the mixture to UV rays under a nitrogen atmosphere such that the mixture was partially photopolymerized.

(Preparation of Acrylic Polymer Syrup 5 (2EHA/AA=94/6) as (A) Component)

Ninety four parts by weight of 2-ethylhexyl acrylate (2EHA), 6 parts by weight of acrylic acid (AA), 0.05 parts by weight of a photo-polymerization initiator (product name: IRGACURE 184, made by Ciba Speciality Chemicals Inc.), and 0.05 parts by weight of a photo-polymerization initiator (product name: IRGACURE 651, made by Ciba Speciality Chemicals Inc.) were placed into a 4-neck flask. A partial polymer (acrylic polymer syrup 5) having a rate of polymerization of approximately 8% by weight was obtained by exposing the mixture to UV rays under a nitrogen atmosphere such that the mixture was partially photopolymerized.

(Preparation of Acrylic Polymer Syrup 6 (2EHA/NVP/HEA=67/15/18) as (A) Component)

Sixty seven parts by weight of 2-ethylhexyl acrylate (2EHA), 15 parts by weight of N-vinyl-2-pyrrolidone (NVP), 18 parts by weight of hydroxyethyl acrylate (HEA), 0.05 parts by weight of a photo-polymerization initiator (product name: IRGACURE 184, made by Ciba Speciality Chemicals Inc.), and 0.05 parts by weight of a photo-polymerization initiator (product name: IRGACURE 651, made by Ciba Speciality Chemicals Inc.) were placed into a 4-neck flask. A partial polymer (acrylic polymer syrup 6) having a rate of polymerization of approximately 10% by weight was obtained by exposing the mixture to UV rays under a nitrogen atmosphere such that the mixture was partially photopolymerized.

(Preparation of Acrylic Polymer Syrup 7 (2EHA/NVP/HEA/4-HBA=67/15/3/15) as (A) Component)

Sixty seven parts by weight of 2-ethylhexyl acrylate (2EHA), 15 parts by weight of N-vinyl-2-pyrrolidone (NVP), 3 parts by weight of hydroxyethyl acrylate (HEA), 15 parts by weight of 4-hydroxybutyl acrylate (4-HBA), 0.05 parts by weight of a photo-polymerization initiator (product name: IRGACURE 184, made by Ciba Speciality Chemicals Inc.), and 0.05 parts by weight of a photo-polymerization initiator (product name: IRGACURE 651, made by Ciba Speciality Chemicals Inc.) were placed into a 4-neck flask. A partial polymer (acrylic polymer syrup 7) having a rate of polymerization of approximately 10% by weight was obtained by exposing the mixture to UV rays under a nitrogen atmosphere such that the mixture was partially photopolymerized.

Example 1

Preparation of Acrylic Pressure-Sensitive Adhesive Composition for Optical Use

After 20 parts by weight of the aforementioned (meth) acrylic polymer 1 and 0.1 parts by weight of trimethylolpropane triacrylate were added to 100 parts by weight of the aforementioned acrylic polymer syrup 1, they were uniformly mixed together such that an acrylic pressure-sensitive adhesive composition was prepared.

(Production of Pressure-Sensitive Adhesive Layer Sheet)

A coated layer having a final thickness of 50 μm was formed by coating the aforementioned acrylic pressure-sensitive adhesive composition on one of the surfaces of a polyester film having a thickness of 38 μm (product name: MRF, made by Mitsubishi Chemical Polyester Co., Ltd.), the one of the surfaces having been subjected to a release treatment with silicone. Subsequently, the surface of the coated acrylic pressure-sensitive adhesive composition was covered with one of the surfaces of a polyester film having a thickness of 38 μm (product name: MRN, made by Mitsubishi Chemical Polyester Co., Ltd.), the one of the surfaces having been subjected to a release treatment with silicone, so that the one of the surfaces of the film was located near to the coated layer. Thereby, oxygen was blocked from the coated layer of the acrylic pressure-sensitive adhesive composition for optical use (pressure-sensitive adhesive layer). The pressure-sensitive adhesive layer sheet thus obtained was irradiated, for 360 seconds, with UV rays with an illumination intensity of 5 mW/cm$^2$ (measured by TOPCON UVR-T1 having a maximum sensitivity at approximately 350 nm), the UV rays being created by using a black light lamp (made by TOSHIBA CORPORATION). The gel fraction of the pressure-sensitive adhesive layer made of the acrylic pressure-sensitive adhesive composition for optical use thus obtained was 65.2% by weight. The polyester film covering each of the surfaces of the pressure-sensitive adhesive layer functions as a release liner.

Example 2

An acrylic pressure-sensitive adhesive composition for optical use and a pressure-sensitive adhesive layer sheet were obtained in the same way as in Example 1, except that 10 parts by weight of the aforementioned (meth)acrylic polymer 1 and 0.085 parts by weight of trimethylolpropane triacrylate were added to 100 parts by weight of the aforementioned acrylic polymer syrup 1. The gel fraction of the obtained pressure-sensitive adhesive layer was 73.5% by weight.

Example 3

An acrylic pressure-sensitive adhesive composition for optical use and a pressure-sensitive adhesive layer sheet were obtained in the same way as in Example 1, except that 30 parts by weight of the aforementioned (meth)acrylic polymer 2 and 0.2 parts by weight of trimethylolpropane triacrylate were added to 100 parts by weight of the aforementioned acrylic polymer syrup 2. The gel fraction of the obtained pressure-sensitive adhesive layer was 61.8% by weight.

Example 4

An acrylic pressure-sensitive adhesive composition for optical use and a pressure-sensitive adhesive layer sheet were obtained in the same way as in Example 1, except that 20 parts by weight of the aforementioned (meth)acrylic polymer 6 and 0.18 parts by weight of trimethylolpropane triacrylate were added to 100 parts by weight of the aforementioned acrylic polymer syrup 3. The gel fraction of the obtained pressure-sensitive adhesive layer was 74.6% by weight.

Example 5

An acrylic pressure-sensitive adhesive composition for optical use and a pressure-sensitive adhesive layer sheet were obtained in the same way as in Example 1, except that 20 parts by weight of the aforementioned (meth)acrylic polymer 2 and 0.18 parts by weight of trimethylolpropane triacrylate were added to 100 parts by weight of the aforementioned acrylic polymer syrup 3. The gel fraction of the obtained pressure-sensitive adhesive layer was 75.3% by weight.

Example 6

An acrylic pressure-sensitive adhesive composition for optical use and a pressure-sensitive adhesive layer sheet were obtained in the same way as in Example 1, except that 10 parts by weight of the aforementioned (meth)acrylic polymer 2 and 0.14 parts by weight of trimethylolpropane triacrylate were added to 100 parts by weight of the aforementioned acrylic polymer syrup 4. The gel fraction of the obtained pressure-sensitive adhesive layer was 79.9% by weight.

Example 7

An acrylic pressure-sensitive adhesive composition for optical use and a pressure-sensitive adhesive layer sheet were obtained in the same way as in Example 1, except that 15 parts by weight of the aforementioned (meth)acrylic polymer 2 and 0.16 parts by weight of trimethylolpropane triacrylate were added to 100 parts by weight of the aforementioned acrylic polymer syrup 4. The gel fraction of the obtained pressure-sensitive adhesive layer was 75.1% by weight.

Example 8

An acrylic pressure-sensitive adhesive composition for optical use and a pressure-sensitive adhesive layer sheet were obtained in the same way as in Example 1, except that 20 parts by weight of the aforementioned (meth)acrylic polymer 3 and 0.22 parts by weight of trimethylolpropane triacrylate were added to 100 parts by weight of the aforementioned acrylic polymer syrup 4. The gel fraction of the obtained pressure-sensitive adhesive layer was 70.5% by weight.

Example 9

An acrylic pressure-sensitive adhesive composition for optical use and a pressure-sensitive adhesive layer sheet were obtained in the same way as in Example 1, except that 20 parts by weight of the aforementioned (meth)acrylic polymer 7 and 0.18 parts by weight of trimethylolpropane triacrylate were added to 100 parts by weight of the aforementioned acrylic polymer syrup 4. The gel fraction of the obtained pressure-sensitive adhesive layer was 70.1% by weight.

Example 10

An acrylic pressure-sensitive adhesive composition for optical use and a pressure-sensitive adhesive layer sheet were obtained in the same way as in Example 1, except that 5 parts by weight of the aforementioned (meth)acrylic polymer 11, 0.11 parts by weight of trimethylolpropane triacrylate, and 0.3 parts by weight of γ-glycidoxypropyltrimethoxysilane (KBM-403) were added to 100 parts by weight of the aforementioned acrylic polymer syrup 6. The gel fraction of the obtained pressure-sensitive adhesive layer was 89.0% by weight.

Example 11

An acrylic pressure-sensitive adhesive composition for optical use and a pressure-sensitive adhesive layer sheet were obtained in the same way as in Example 1, except that 3 parts by weight of the aforementioned (meth)acrylic polymer 12, 0.11 parts by weight of trimethylolpropane triacrylate, and 0.3 parts by weight of γ-glycidoxypropyltrimethoxysilane (KBM-403) were added to 100 parts by weight of the aforementioned acrylic polymer syrup 6. The gel fraction of the obtained pressure-sensitive adhesive layer was 90.2% by weight.

Example 12

An acrylic pressure-sensitive adhesive composition for optical use and a pressure-sensitive adhesive layer sheet were obtained in the same way as in Example 1, except that 4 parts by weight of the aforementioned (meth)acrylic polymer 13, 0.14 parts by weight of trimethylolpropane triacrylate, and 0.3 parts by weight of γ-glycidoxypropyltrimethoxysilane (KBM-403) were added to 100 parts by weight of the aforementioned acrylic polymer syrup 6. The gel fraction of the obtained pressure-sensitive adhesive layer was 88.8% by weight.

Example 13

An acrylic pressure-sensitive adhesive composition for optical use and a pressure-sensitive adhesive layer sheet were obtained in the same way as in Example 1, except that 5 parts by weight of the aforementioned (meth)acrylic polymer 13, 0.11 parts by weight of trimethylolpropane triacrylate, and 1 part by weight of γ-glycidoxypropyltrimethoxysilane (KBM-403) were added to 100 parts by weight of the aforementioned acrylic polymer syrup 6. The gel fraction of the obtained pressure-sensitive adhesive layer was 85.5% by weight.

Example 14

An acrylic pressure-sensitive adhesive composition for optical use and a pressure-sensitive adhesive layer sheet were obtained in the same way as in Example 1, except that 5 parts by weight of the aforementioned (meth)acrylic polymer 13, 0.04 parts by weight of trimethylolpropane triacrylate, and 0.3 parts by weight of γ-glycidoxypropyltrimethoxysilane (KBM-403) were added to 100 parts by weight of the aforementioned acrylic polymer syrup 7. The gel fraction of the obtained pressure-sensitive adhesive layer was 82.4% by weight.

Comparative Example 1

An acrylic pressure-sensitive adhesive composition for optical use and a pressure-sensitive adhesive layer sheet were obtained in the same way as in Example 1, except that 0.04 parts by weight of trimethylolpropane triacrylate were added to 100 parts by weight of the aforementioned acrylic polymer syrup 1. The gel fraction of the obtained pressure-sensitive adhesive layer was 68.5% by weight.

Comparative Example 2

An acrylic pressure-sensitive adhesive composition for optical use and a pressure-sensitive adhesive layer sheet were obtained in the same way as in Example 1, except that 0.015 parts by weight of trimethylolpropane triacrylate were added to 100 parts by weight of the aforementioned acrylic polymer syrup 3. The gel fraction of the obtained pressure-sensitive adhesive layer was 80.8% by weight.

Comparative Example 3

An acrylic pressure-sensitive adhesive composition for optical use and a pressure-sensitive adhesive layer sheet were obtained in the same way as in Example 1, except that 20 parts by weight of the aforementioned (meth)acrylic polymer 1 and 0.14 parts by weight of trimethylolpropane triacrylate were added to 100 parts by weight of the aforementioned acrylic polymer syrup 5. The gel fraction of the obtained pressure-sensitive adhesive layer was 61.7% by weight.

Comparative Example 4

An acrylic pressure-sensitive adhesive composition for optical use and a pressure-sensitive adhesive layer sheet were obtained in the same way as in Example 1, except that 20 parts by weight of the aforementioned (meth)acrylic polymer 4 and 0.18 parts by weight of trimethylolpropane triacrylate were added to 100 parts by weight of the aforementioned acrylic polymer syrup 5. The gel fraction of the obtained pressure-sensitive adhesive layer was 62.1% by weight.

Comparative Example 5

An acrylic pressure-sensitive adhesive composition for optical use and a pressure-sensitive adhesive layer sheet were obtained in the same way as in Example 1, except that 20 parts by weight of the aforementioned (meth)acrylic polymer 5 and 0.11 parts by weight of 1,6-hexanediol diacrylate were added to 100 parts by weight of the aforementioned acrylic polymer syrup 5. The gel fraction of the obtained pressure-sensitive adhesive layer was 69.7% by weight.

Comparative Example 6

An acrylic pressure-sensitive adhesive composition for optical use and a pressure-sensitive adhesive layer sheet were obtained in the same way as in Example 1, except that 20 parts by weight of the aforementioned (meth)acrylic polymer 8 and 0.11 parts by weight of 1,6-hexanediol diacrylate were added to 100 parts by weight of the aforementioned acrylic polymer syrup 5. The gel fraction of the obtained pressure-sensitive adhesive layer was 67.7% by weight.

Comparative Example 7

An acrylic pressure-sensitive adhesive composition for optical use and a pressure-sensitive adhesive layer sheet were obtained in the same way as in Example 1, except that 20 parts by weight of the aforementioned (meth)acrylic polymer 9 and 0.1 parts by weight of trimethylolpropane triacrylate were added to 100 parts by weight of the aforementioned acrylic polymer syrup 5. The gel fraction of the obtained pressure-sensitive adhesive layer was 61.0% by weight.

Comparative Example 8

An acrylic pressure-sensitive adhesive composition for optical use and a pressure-sensitive adhesive layer sheet were obtained in the same way as in Example 1, except that 20 parts by weight of the aforementioned (meth)acrylic polymer 10 and 0.1 parts by weight of trimethylolpropane triacrylate were added to 100 parts by weight of the aforementioned acrylic polymer syrup 5. The gel fraction of the obtained pressure-sensitive adhesive layer was 65.0% by weight.

(Test Method)
[Total Light Transmittance Test and Haze Test (Transparency Evaluation)]

After one of the release liners (polyester films) of the pressure-sensitive adhesive layer sheet according to each of Examples and Comparative Examples was peeled off, the pressure-sensitive adhesive surface was attached to slide glass having a thickness of 0.8 mm (part number: S-1111, made by Matsunami Glass Ind., Ltd.). Subsequently, the other release liner (polyester film) of the pressure-sensitive adhesive layer sheet was peeled off to measure, with a haze meter (made by MURAKAMI COLOR RESEARCH LABORATORY Co., Ltd.), the total light transmittance and haze of a structure in which the pressure-sensitive adhesive layer sheet and the slide glass have been attached together. A total light transmittance more than or equal to 90% was evaluated as good (○), while that less than 90% was evaluated as bad (x). A haze less than 2 was evaluated as good (○), while that more than or equal to 2 was evaluated as bad (x). Results of the measurement are shown in Table 3.

[Foaming and Peeling-Off Resistance Test (Adhesiveness Evaluation)]

After one of the release liners (polyester films) of the pressure-sensitive adhesive layer sheet according to each of Examples and Comparative Examples was peeled off, the pressure-sensitive adhesive surface thereof was attached to an acrylic plate having a thickness of 2 mm (ACRYLITE, made by Mitsubishi Rayon Co., Ltd.) Subsequently, the other release liner (polyester film) of the pressure-sensitive adhesive layer sheet was peeled off and a polyester film having a thickness of 100 mm (product name: A4100, made by TOYOBO CO., LTD.) was attached to the pressure-sensitive adhesive surface thereof. After the obtained laminated body was fully accustomed to a temperature environment of 50° C. by leaving it uncontrolled under the environment for one day, the laminated body was left uncontrolled under a temperature environment of 80° C. for 4 days, thereafter the appearances of foaming and peeling-off were observed. Foaming in which the average diameter of generated foams was less than 1 mm was evaluated as good (○), while foaming in which the average diameter thereof was more than or equal to 1 mm was evaluated as bad (x). With respect to peeling-off, the case where no peeing-off had been generated was evaluated as good (○), while the case where peeling-off had been generated was evaluated as bad (x). Results of the measurement are shown in Table 3.

[Test for Change in ITO Film Resistance (Corrosiveness Evaluation)]

Figure 4:
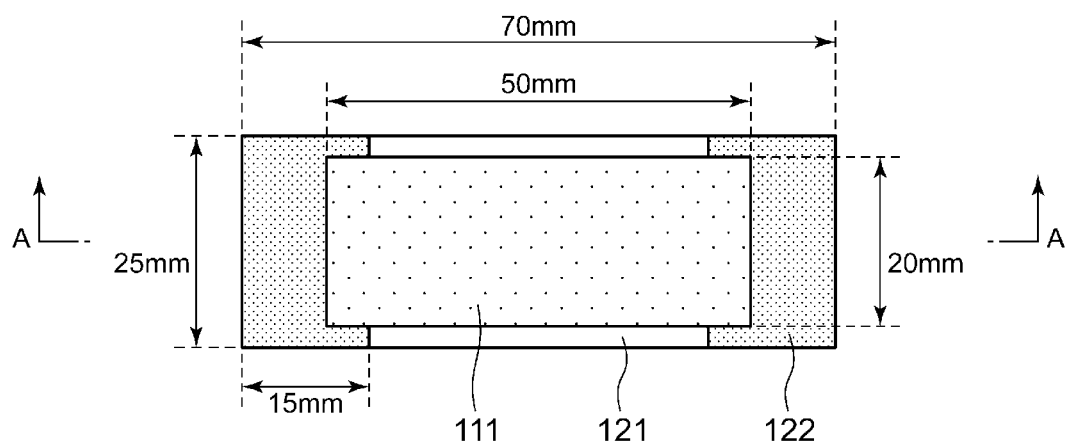
FIG. 4 is a schematic plan view illustrating a measurement sample used in a test for a change in the ITO film resistance.
Figure 5:
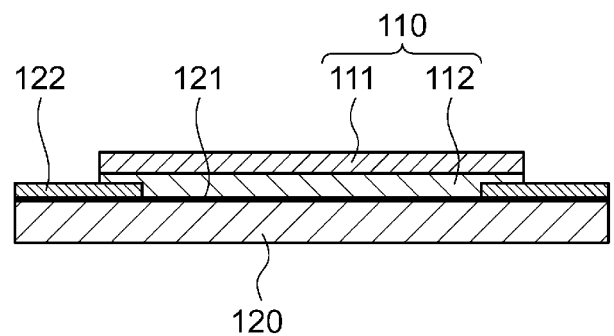
FIG. 5 is a schematic sectional view, taken along A-A Line in FIG. 4.

A test for a change in the ITO film resistance will be described with reference to FIGS. 4 and 5. FIG. 4 is a schematic plan view illustrating a measurement sample used in the above test. FIG. 5 is a schematic sectional view, taken along A-A Line in FIG. 4.

As illustrated in FIGS. 4 and 5, one of the release liners (polyester films) (not illustrated) of a pressure-sensitive adhesive layer sheet 112 according to each of Examples and Comparative Examples was first peeled off, and a PET film 111 having a thickness of 25 μm (product name: LUMIRROR S-10 #25, made by TORAY INDUSTRIES, INC.) was attached to the pressure-sensitive adhesive surface. The obtained object was then cut into a piece having a size of 20 mm in width×50 mm in length to obtain a test specimen 110. Subsequently, a conductive PET film 120 (product name: ELECRYSTA V-270 TEMP, made by NITTO DENKO CORPORATION) having a size of 70 mm in length×25 mm in width, on one of the surfaces of which an ITO film 121 has been formed, was prepared. Silver paste layers 122 each having a width of 15 mm were then formed by coating silver paste onto both end portions of the ITO film 121 that has been formed on the surface of the PET film 120. Subsequently, the other release liner (polyester film) (not illustrated) of the pressure-sensitive adhesive layer sheet 112 was peeled off and the pressure-sensitive adhesive surface thereof was attached to the ITO film 121, thereby allowing the test specimen 110 to be attached to the conductive PET film 120. At the time, the test specimen 110 was attached to the PET film 120 such that part of the test specimen 110 covered part of the silver paste layer 122 at both end portions.

Subsequently, the electric resistance of the ITO film 121 was measured immediately after the test specimen 110 was attached to the conductive PET film 120. After being left uncontrolled under a temperature environment of 23° C. for 24 hours, the attached object was further left uncontrolled under an environment of temperature of 60° C.×humidity of 95% RH for 6 days. Thereafter, the electric resistance of the ITO film 121 was again measured. The electric resistance thereof was measured by connecting an electrode to each of the silver paste portions 122 at both end portions and by using Milli-Ohm HiTester 3540 (made by HIOKI E. E., CORPORATION). Assuming that the electric resistance immediately after the attachment was made to be 100, the electric resistance after 6 days was calculated to evaluate a change in the electric resistance. The case where the obtained value was less than or equal to 120 was evaluated as good (○), while the case where the value was more than 120 was evaluated as bad (x). Results of the measurement are shown in Table 3.

TABLE 3

|  | TOTAL LIGHT TRANSMITTANCE (%) | HAZE | FOAMING [mm] | PEELING-OFF | CHANGE IN ITO RESISTANCE |
|---|---|---|---|---|---|
| EXAMPLE 1 | 92(○) | 0.5(○) | 0.05(○) | ○ | ○ |
| EXAMPLE 2 | 92(○) | 0.4(○) | 0.05(○) | ○ | ○ |
| EXAMPLE 3 | 92(○) | 1.2(○) | 0.00(○) | ○ | ○ |
| EXAMPLE 4 | 92(○) | 0.5(○) | 0.00(○) | ○ | ○ |
| EXAMPLE 5 | 92(○) | 0.7(○) | 0.00(○) | ○ | ○ |
| EXAMPLE 6 | 92(○) | 0.5(○) | 0.00(○) | ○ | ○ |
| EXAMPLE 7 | 92(○) | 0.5(○) | 0.00(○) | ○ | ○ |
| EXAMPLE 8 | 92(○) | 0.7(○) | 0.00(○) | ○ | ○ |
| EXAMPLE 9 | 92(○) | 0.7(○) | 0.00(○) | ○ | ○ |
| EXAMPLE 10 | 92(○) | 0.6(○) | 0.00(○) | ○ | ○ |
| EXAMPLE 11 | 92(○) | 0.7(○) | 0.00(○) | ○ | ○ |
| EXAMPLE 12 | 92(○) | 0.4(○) | 0.00(○) | ○ | ○ |
| EXAMPLE 13 | 92(○) | 0.7(○) | 0.00(○) | ○ | ○ |
| EXAMPLE 14 | 92(○) | 0.3(○) | 0.00(○) | ○ | ○ |
| COMPARATIVE EXAMPLE 1 | 92(○) | 0.4(○) | 0.00(○) | x | ○ |
| COMPARATIVE EXAMPLE 2 | 92(○) | 0.5(○) | 1.20(x) | ○ | ○ |
| COMPARATIVE EXAMPLE 3 | 88(x) | 14(x) | 0.00(○) | x | x |
| COMPARATIVE EXAMPLE 4 | 90(○) | 1.9(○) | 0.00(○) | x | x |
| COMPARATIVE EXAMPLE 5 | 89(x) | 25(x) | 0.00(○) | x | x |
| COMPARATIVE EXAMPLE 6 | 92(○) | 0.4(○) | 0.00(○) | x | x |
| COMPARATIVE EXAMPLE 7 | 92(○) | 0.4(○) | 2.00(x) | ○ | x |
| COMPARATIVE EXAMPLE 8 | 92(○) | 0.4(○) | 4.00(x) | ○ | x |

As shown in Table 3, in Comparative Examples 1 to 8, at least one of the total light transmittance, haze, foaming, peeling-off, and change in the ITO resistance, was bad. On the other hand, in Examples 1 to 14, all of them were good. That is, it has been confirmed that high transparency, high adhesiveness, and low corrosiveness are combined in each of Examples 1 to 14.

What is claimed is:

1. An acrylic pressure-sensitive adhesive composition for optical use, comprising:
    an acrylic polymer (A) that contains, as a monomer unit, a vinyl monomer having a nitrogen atom in its backbone and a carboxyl group-containing monomer in an amount of less than 0.1% by weight relative to the total weight of the whole monomer components; and a (meth)acrylic polymer (B) having a weight average molecular weight of 1000 or more and less than 30000.

2. The acrylic pressure-sensitive adhesive composition for optical use according to claim 1, wherein the acrylic polymer (A) is a copolymer in which the vinyl monomer and a (meth)acrylic acid ester represented by the following general formula (1) are copolymerized together as an essential component:

$$CH_2=C(R^1)COOR^2 \qquad (1)$$

[wherein, $R^1$ is a hydrogen atom or methyl group and $R^2$ is a $C_{1-12}$ alkyl group or alicyclic hydrocarbon group].

3. The acrylic pressure-sensitive adhesive composition for optical use according to claim 1, wherein the vinyl monomer is one or more types of monomers selected from the group consisting of the N-vinyl cyclic amides represented by the following general formula (2) and (meth)acrylic amides:

[Formula 1]

(2)

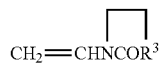

$CH_2$═$CHNCOR^3$

[wherein, $R^3$ is a divalent organic group].

4. The acrylic pressure-sensitive adhesive composition for optical use according to claim 1, wherein the content of the (meth)acrylic polymer (B) is within a range of 2 to 70 parts by weight, based on 100 parts by weight of the acrylic polymer (A).

5. An acrylic pressure-sensitive adhesive tape for optical use having a pressure-sensitive adhesive layer containing the acrylic pressure-sensitive adhesive composition for optical use, wherein the acrylic pressure-sensitive adhesive composition comprises:

an acrylic polymer (A) that contains, as a monomer unit, a vinyl monomer having a nitrogen atom in its backbone and a carboxyl group-containing monomer in an amount of less than 0.1% by weight relative to the total weight of the whole monomer components; and a (meth)acrylic polymer (B) having a weight average molecular weight of 1000 or more and less than 30000.

6. The acrylic pressure-sensitive adhesive composition for optical use according to claim 2, wherein the vinyl monomer is one or more types of monomers selected from the group consisting of the N-vinyl cyclic amides represented by the following general formula (2) and (meth)acrylic amides:

[Formula 1]

(2)

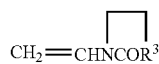

$CH_2$═$CHNCOR^3$

[wherein, $R^3$ is a divalent organic group].

7. The acrylic pressure-sensitive adhesive composition for optical use according to claim 2, wherein the content of the (meth)acrylic polymer (B) is within a range of 2 to 70 parts by weight, based on 100 parts by weight of the acrylic polymer (A).

8. The acrylic pressure-sensitive adhesive composition for optical use according to claim 3, wherein the content of the (meth)acrylic polymer (B) is within a range of 2 to 70 parts by weight, based on 100 parts by weight of the acrylic polymer (A).

9. The acrylic pressure-sensitive adhesive composition for optical use according to claim 6, wherein the content of the (meth)acrylic polymer (B) is within a range of 2 to 70 parts by weight, based on 100 parts by weight of the acrylic polymer (A).

10. The acrylic pressure-sensitive adhesive tape for optical use according to claim 5, wherein the acrylic polymer (A) is a copolymer in which the vinyl monomer and a (meth)acrylic acid ester represented by the following general formula (1) are copolymerized together as an essential component:

$$CH2=C(R^1)COOR^2 \qquad (1)$$

[wherein, R1 is a hydrogen atom or methyl group and R2 is a C1-12 alkyl group or alicyclic hydrocarbon group].

11. The acrylic pressure-sensitive adhesive tape for optical use according to claim 5, wherein the vinyl monomer is one or more types of monomers selected from the group consisting of the N-vinyl cyclic amides represented by the following general formula (2) and (meth)acrylic amides:

[Formula 2]

(2)

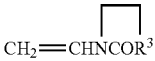

$CH_2$═$CHNCOR^3$

[wherein, R3 is a divalent organic group].

12. The acrylic pressure-sensitive adhesive tape for optical use according to claim 5, wherein the content of the (meth)acrylic polymer (B) is within a range of 2 to 70 parts by weight, based on 100 parts by weight of the acrylic polymer (A).

13. The acrylic pressure-sensitive adhesive tape for optical use according to claim 10, wherein the vinyl monomer is one or more types of monomers selected from the group consisting of the N-vinyl cyclic amides represented by the following general formula (2) and (meth)acrylic amides:

[Formula 2]

(2)

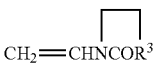

$CH_2$═$CHNCOR^3$

[wherein, R3 is a divalent organic group].

14. The acrylic pressure-sensitive adhesive tape for optical use according to claim 10, wherein the content of the (meth)acrylic polymer (B) is within a range of 2 to 70 parts by weight, based on 100 parts by weight of the acrylic polymer (A).

15. The acrylic pressure-sensitive adhesive tape for optical use according to claim 11, wherein the content of the (meth)acrylic polymer (B) is within a range of 2 to 70 parts by weight, based on 100 parts by weight of the acrylic polymer (A).

16. The acrylic pressure-sensitive adhesive tape for optical use according to claim 13, wherein the content of the (meth)acrylic polymer (B) is within a range of 2 to 70 parts by weight, based on 100 parts by weight of the acrylic polymer (A).

\* \* \* \* \*